United States Patent [19]

Mizuma et al.

[11] Patent Number: 5,764,744
[45] Date of Patent: Jun. 9, 1998

[54] INTELLIGENT NETWORK CALL TERMINATING METHOD IN INTELLIGENT NETWORK, AND SERVICE EXCHANGE SYSTEM AND DESTINATION EXCHANGE SYSTEM EACH USED IN INTELLIGENT NETWORK

[75] Inventors: Terumi Mizuma; Mika Takeuchi; Toshiaki Saito, all of Kawasaki, Japan

[73] Assignee: Fujitsu Limited, Kanagawa, Japan

[21] Appl. No.: 495,215

[22] Filed: Jun. 27, 1995

[30] Foreign Application Priority Data

Aug. 30, 1994 [JP] Japan .................. 6-205791

[51] Int. Cl.⁶ .................................. H04M 3/42
[52] U.S. Cl. .................. 379/207; 379/201; 379/220; 379/196; 379/246; 379/247
[58] Field of Search ................. 379/207, 220, 379/221, 112, 114, 115, 230, 188, 196, 201, 246, 247

[56] References Cited

U.S. PATENT DOCUMENTS

| | | | |
|---|---|---|---|
| 4,277,649 | 7/1981 | Sheinbein | 379/201 |
| 5,206,901 | 4/1993 | Harlow et al. | 379/207 |
| 5,377,186 | 12/1994 | Wegner et al. | 379/207 |
| 5,436,957 | 7/1995 | McConnell | 379/196 |
| 5,524,145 | 6/1996 | Parker | 379/207 |
| 5,550,904 | 8/1996 | Andruska et al. | 379/201 |
| 5,572,579 | 11/1996 | Orriss et al. | 379/220 |
| 5,574,781 | 11/1996 | Blaze | 379/220 |

*Primary Examiner*—Ahmad F. Matar
*Attorney, Agent, or Firm*—Helfgott & Karas, PG.

[57] ABSTRACT

The present invention relates to a technology regarding an intelligent network. When an originating subscriber accesses an information offer service by inputting service access information, a service switching point accesses a service control point. The service control point further implements a desired service process corresponding to the service access information, in response to the above step. When the service switching point is informed of the process result, the service switching point is connected to a destination station which accommodates a destination subscriber providing an information offer service, using a method of discriminating an intelligent network call, based on the result processed by the service control point, so that an incoming call to the destination subscriber is established. The object is to regulate certainly a bypass call in a information offer service.

9 Claims, 22 Drawing Sheets

IP SUBSCRIBER DATA IPD

*A REGULATION PRESENCE/ABSENCE DISPLAY IN INFORMATION OFFER SERVICE

INFORMATION OFFER SERVICE REGULATION/ NON REGULATION = 1/0

INCOMING TG CLASS DATA TGCD

*B DISPLAY FOR DEDICATED ROUTE

INFORMATION OFFER SERVICE ACCEPTED/ NOT ACCEPTED = 1/0

INTELLIGENT NETWORK CALL TERMINATING METHOD IN INTELLIGENT NETWORK, AND SERVICE EXCHANGE SYSTEM AND DESTINATION EXCHANGE SYSTEM EACH USED IN INTELLIGENT NETWORK

BACKGROUND OF THE INVENTION

1) Field of the Invention

The present invention relates to an intelligent network call terminating method in an intelligent network, and a service exchange system and a destination exchange system each used in an intelligent network.

2) Description of the Related Art

An information offer service is one of service functions in intelligent networks. In the charging system to the information offer service, various charging systems are adopted as a charging system for the information offer service to a great variety of services.

For example, in additional rate services such as dial $Q^2$ services being in effect in Japan, an additional charge is added as an information offer charge according to kinds of offered information, in addition to a normal charge.

Next let us explain the case where an additional rate service is provided. As shown in FIG. 23, an originating subscriber 101 dials a service access code (SAC) "1900xxxxxxx" at an originating time (refer to FIG. 23(1)). Then the service access code SAC is transmitted to a service switching point (SSP) 102 via an originating point 106. When the service switching point 102 recognizes an intelligent network call (IN), it inquires the service access code (SAC) from a service control point (SCP) 103 (refer to (2) in FIG. 23).

The SCP 103 accesses the database 103A and then converts the telephone number (the number dialed by a subscriber) received from the SSP 102 into an actually terminated number "777-1111". If the conversion is accepted as OK, the converted telephone number is reported to the SSP 102 (refer to (3) in FIG. 23).

The SSP 102 is connected to the destination point (destination LS) 104 accommodating the subscriber of the converted telephone number (refer to (4) in FIG. 23) so that the call is terminated to an information provider (IP) 105 (refer to (5) in FIG. 23) providing an information service.

As a result, the SSP 102 and the SCP 103 carry out both a normal charging and a special charging process such as AMA for additional rate to the call.

However, in the conventional IN call terminating method, something may cause a cross talk of the telephone number "777-1111" of IP 105 after a conversion operation. In this case, when an originating subscriber 101 dials the telephone number of IP 105 after a conversion operation without dialing the service access code SAC for information offer service (refer to (1)' in FIG. 23), the call may be connected as a normal call to the provider 105 providing an information offer service (refer to (2)' in FIG. 23).

For that reason, an information offer service is provided to the call for only a normal charge, without adding an additional charge. Namely, there has been a disadvantage in that the conventional method cannot certainly bar a bypass call to an information offer service.

SUMMARY OF THE INVENTION

The present invention is made to overcome the above mentioned problems. An object of the present invention is to provide an intelligent call terminating method in an intelligent network that can regulate certainly a bypass call to an information offer service.

Another object of the present invention is to provide a service exchange system used in an intelligent network that can regulate certainly a bypass call to an information offer service.

Still further object of the present invention is to provide a destination exchange system that can regulate certainly a bypass call to an information offer service.

In order to achieve the above objects, according to the present invention, the intelligent network call terminating method in an intelligent network is characterized by a first step of accessing an information offer service, using a service access code input by an originating subscriber; a second step in which a service switching point accesses a service control point when the service switching point receives the service access code input in said first step; a third step in which the service control point implements a desired service process corresponding to the service access code, in response to the access in the second step, and then informs the service switching point of the result processed; and a fourth step in which the service switching point is connected to a destination station which accommodates a destination subscriber providing an information offer service, using a method by which the destination station can discriminate an intelligent network call based on the result processed in the third step, so that an incoming call to the destination subscriber is established.

In other words, the intelligent network call terminating method in an intelligent network according to the present invention, the service switching point is connected to a destination station which accommodates a destination subscriber providing an information offer service, using a method by which the destination station can discriminate an intelligent network call based on the result processed in the third step, so that an incoming call to the destination subscriber is established. Hence, there is an advantage in that an information offer service can be accurately provided to a proper request but can be certainly regulated to a bypass call for the information offer service.

Furthermore, according to the present invention, the service exchange system used in an intelligent network, the service exchange system that accesses a service control point in response to service access code input by an originating subscriber and outputs a signal sending an incoming call to the destination subscriber, to a destination station accommodating a destination subscriber providing an information offer service in response to the service process result from the service control point, is characterized by hunting means for hunting an information offer service-only signal route when a service process result is received from the service control point.

Therefore, according to the present invention, the service exchange system used in an intelligent network includes hunting means for hunting an information offer service-only signal route when a service process result is received from the service control point. Hence, there is an advantage in that an information offer service can be accurately provided to a proper request but can be certainly regulated to a bypass call for the information offer service.

Moreover, according to the present invention, the service exchange system used in an intelligent network, the service exchange system that accesses a service control point in response to service access code input by an originating subscriber and outputs a signal sending an incoming call to the destination subscriber, to a destination station accommodating a destination subscriber providing information offer service in response to the service process result from the service control point, is characterized by transmitting means for transmitting information by which an intelligent network call can be discriminated in the destination station in response to the service process result from the service control point.

Therefore, according to the present invention, the service exchange system used in an intelligent network includes transmitting means for transmitting information by which an intelligent network call can be discriminated in the destination station in response to the service process result from the service control point. Hence, there is an advantage in that an information offer service can be accurately provided to a proper request but can be certainly regulated to a bypass call for the information offer service.

According to the present invention, the destination exchange system used in an intelligent network, the intelligent network accommodating a destination subscriber providing an information offer service in response to a request from an originating subscriber, is characterized by an incoming trunk for accommodating an information offer service-only signal route; and means for terminating a call to the destination subscriber in response to a signal from service switching point input through the incoming trunk.

As described above, the destination exchange system used in an intelligent network according to the present invention includes an incoming trunk for accommodating an information offer service-only signal route; and means for terminating a call to the destination subscriber in response to a signal from service switching point input through the incoming trunk. Hence there is an advantage in that an information offer service can be accurately provided to a proper request but can be certainly regulated to a bypass call for the information offer service.

Furthermore, according to the present invention, the destination exchange system used in an intelligent network, the intelligent network accommodating a destination subscriber providing an information offer service in response to a request from an originating subscriber, is characterized by means for terminating a call to the destination subscriber in response to a signal to which information representing an intelligent network call is added.

As described above, the destination exchange system used in an intelligent network according to the present invention includes means for terminating a call to the destination subscriber in response to a signal to which information representing an intelligent network call is added. Similarly, there is an advantage in that an information offer service can be accurately provided to a proper request but can be certainly regulated to a bypass call for the information offer service.

DESCRIPTION OF THE PREFERRED EMBODIMENTS (a) Aspect of the Invention:

An aspect of the present invention will be described with reference to the attached drawings.

Figure 1:
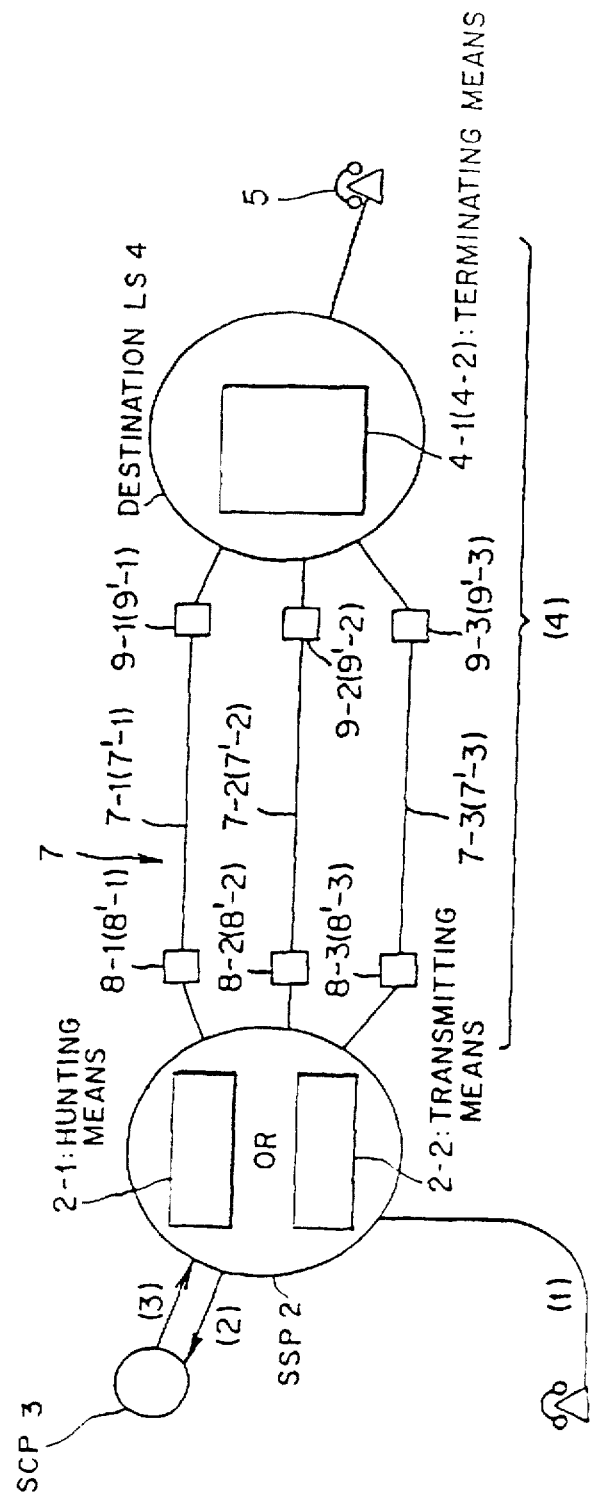
FIG. 1 is a block diagram showing an aspect of the present invention.

FIG. 1 is a block diagram showing an aspect of the present invention. Referring to FIG. 1, numeral 1 represents an originating subscriber, 2 represents a service switching point (service switching unit), 3 represents a service control point (service control unit), 4 represents a destination station (destination switching unit), and 5 represents a destination subscriber (provider) having an information offer service. The service switching point 2 and the destination station 4 are connected via signal lines 7. The speech paths are not shown in FIG. 1.

When inputting service access information, the originating subscriber 1 can receive an information offer service held by the destination subscriber 5. The originating subscriber 1 is connected to the service switching point 2.

The service switching point 2 accesses the service control point 3 in response to service access information input by the originating subscriber 1, and then outputs a signal terminated to the destination subscriber 5 to the destination station 4 which holds the destination subscriber 5 providing an information offer service, in response to a service process result from the service control point 3. The service switching point 2 also includes hunting means 2-1 that hunts information offer service-only signal route 7-3 in response to a service process result from the service control point 3, or transmitting means 2-2 that transmits information by which the destination station 4 can recognize an intelligent network call, in response to a service process result from the service control point 3.

The transmitting means 2-2 may be constituted as means that adapts to the ISUP line 7'-3 in response to the service process result from the service control point 3 and then transmits a signal to which information representing an intelligent network call is added, to the destination station 4. The transmitting means 2-2 also may be constituted as means that transmits dummy information as originating subscriber information to the destination station 4 when a service process result is received from the service control point 3.

When the service switching point 2 accesses according to service access information from the originating subscriber 1, the service control point 3 performs a desired service process corresponding to the service access information in response to the accessing, thus informing the service switching point 2 of the process result.

The destination station 4 accommodates the destination subscriber 5 which can provide an information offer service in response to a request from the originating subscriber 1. The destination station 4 includes terminating means 4-1 that terminates a call to the destination subscriber 5 when a signal is received from the service switching point 2 input via the incoming trunk 9-3 or terminating means 4-2 that terminates a call to the destination subscriber 5 when a signal to which information representing an intelligent network call is added is received, in addition to an incoming trunk 9-3 that accommodates an information offer service-only signal route 7-3.

The terminating means 4-1 consists of means that holds an information offer service display on the subscriber data of the destination subscriber 5; means that arranges an information offer service access display on data of the incoming trunk 9-3; comparing means that compares the information offer service access display with information offer service display when there is an incoming call using the information offer service-only signal route 7-3; deciding means that decides whether to terminate a call to the destination subscriber 5 according to the result compared by the comparing means; and destination means that terminates a call to the destination subscriber 5 based on the decision result by the deciding means.

In the case where the terminating means 4-2 is arranged, the system is constituted according to the following item (1) or (2).

(1) The terminating means 4-2 includes means that adds an information offer service display on the subscriber data of the destination subscriber 5; receiving means that receives a signal to which information representing an intelligent network call is added, transmitted via the ISUP line 7'-3; comparing means that compares a signal received by the receiving means, the signal to which information representing an intelligent network call is added, with an information offer service display; deciding means that decides whether to terminate a call to the destination subscriber 5 according to the comparison result of the comparing means; and destination means that terminates a call to the destination subscriber 5 based on decision result from the deciding means.

(2) Destination means may be arranged that forms a signal to which information representing an intelligent network call is added as a dummy information signal representing originating subscriber information, and terminates an incoming call to the destination subscriber 5 when the dummy information signal is received.

Moreover, the destination subscriber 5 which provides an information offer service is accommodated in the destination station 4.

The signal network 7 is formed of plural signal lines 7-1 to 7-3 (7'-1 to 7'-3). The lines have one ends connected to outgoing trunks 8-1 to 8-3 (8'-1 to 8'-3) and the other ends connected to incoming ends 9-1 to 9-3 (9'-1 to 9'-3), respectively.

According to the present invention described above, an originating subscriber 1 inputs a service access code to access an information offer service in the first step (refer to (1) in FIG. 1) and then the service switching point 2 accesses the service control point 3 in response to the service access code input in the first step (refer to (2) in FIG. 1).

In the third step, the service control point 3 implements a desired service process corresponding to the service access code according to the access in the second step and then notifies the service switching point 2 of the resultant process (refer to (3) in FIG. 1).

Furthermore, in the fourth step, the service switching point 2 is connected to the destination station 4 that accommodates a destination subscriber 5 having an information offer service according to an access in the third step, using a method of discriminating an intelligent network call in the destination station, so that a call to the destination subscriber 5 is established (refer to (4) in FIG. 1).

In the case of an intelligent network call, the hunting means 2-1 hunts the information offer service-only signal route 7-3, according to the processed result in the third step so that the service switching point 2 is connected to the destination station 4 holding the destination subscriber 5 having an information offer service, thus terminating a call to the destination subscriber 5.

In this case, in the destination station 4, an information offer service display is held previously on the subscriber data of the destination subscriber 5 while an information offer service access display is arranged on the incoming trunk data of the information offer service-only signal route 7-3. When there is an incoming call using the information offer service-only signal route 7-3, the information offer service access display is compared with the information offer service display in the destination station 4. Then it is decided whether to terminate the call to the destination subscriber, according to the compared result.

In the case of an intelligent network call, the service switching point 2 transmits a signal to which information representing an intelligent network call is added, to the destination station 4, based on the result processed in the third step. Then the destination station 4 receives a signal to which information representing an intelligent network call is added, to terminate a call to the destination subscriber 5.

In this case, the signal to which information representing an intelligent network call is added is transmitted via the ISUP line 7'-3.

In the destination station 4, with the information offer service display held previously on the subscriber data of a destination subscriber, information representing the intelligent network call is compared with an information offer service display. Thus it is decided whether to terminate a call to the destination subscriber 5 according to the comparison result.

In the case of an intelligent network call, the service switching point 2 transmits dummy information as originating subscriber information to the destination station 4, based on the result processed in the third step. The destination office 4 makes the destination subscriber 5 receive an incoming call, in response to the dummy information.

Hence, according to the intelligent call terminating method in an intelligent network of the present invention described above, the service switching point 2 is connected to the destination station 4 accommodating the destination subscriber 5 having an information offer service, using a method of discriminating an intelligent network call in the destination station 4, to establish an incoming call to the destination subscriber 5. Hence, a proper service can be accurately provided to an information offer service, whereas an information offer service can be surely regulated to a bypass call.

As a method of discriminating an intelligent network call in the destination station 4, a method that holds an information offer service display on destination subscriber data and an information offer service access display on the incoming trunk 9-3, or a method that adds an information offer service parameter to an ISUP message at a special information offer service access time can be adopted. In such a manner, the destination station 4 can check those displays, decide on a special service accepted call, and can surely regulate that the originating subscriber 1 calls the information offer destination subscriber 5 without dialing for service access information for a special information offer service. As a result, even in such a case, it can be certainly prevented that a special information offer service is provided with only a normal charge, without adding an additional charge.

When an incoming call is an intelligent network call, the service switching point 2 sends dummy information as originating subscriber information to the destination office 4. When the destination office 4 receives the dummy information, it enables an incoming call to the destination subscriber 5. In such a manner, a rough method can accurately provide an information offer service in response to a proper request and can certainly regulate an information offer service to a bypass call.

According to the present invention, the service exchange system used in an intelligent network includes hunting means 2-1 that hunts an information offer service-only signal route 7-3 in response to a service process result from the service control point 3, or transmitting means 2-2 that transmits information representing an intelligent network discriminated in the destination station 4, in response to a service process result from the service control point 3. Hence, an information offer service can be accurately provided to a proper request. The information offer service can be certainly regulated to a bypass call.

The use of means that adapts to the ISUP line 7'-3 in response to a service process result from the service control point 3 as transmitting means 2-2, and transmits a signal to which information representing an intelligent network call is added, to the destination station 4, or means that transmits dummy information as originating subscriber information to the destination station 4, in response to a service process result from the service control point 3, can improve further realization of the above-mentioned effect.

According to the present invention, the destination exchange system used in an intelligent network includes an incoming trunk 9-3 that accommodates the information offer service-only signal route 7-3 and means 4-1 that terminates a call to the destination subscriber 5, in response to a signal from the service switching point 2 input through the incoming trunk 9-3. Hence an information offer service can be accurately provided to a proper request. However, the information offer service is certainly regulated to a bypass call.

In this case, with an information offer service display held on the subscriber data of the destination subscriber 5 and an information offer service access display arranged on data of the incoming trunk 9-3, when there is an incoming call using the information offer service-only signal route 7-3, the information offer service access display is compared with the information offer service display to decide whether to terminate an incoming call to the destination subscriber 5, based on the comparison result. It is possible to further improve realization of the above-mentioned effect by making the destination subscriber 5 receive an incoming call, based on the decision result.

Furthermore, according to the present invention, the terminating exchange system used in an intelligent network includes means 4-2 that terminates an incoming call to the destination subscriber 5, in response to a signal to which information representing an intelligent network call is added. Hence, an information offer service can be accurately provided to a proper request, whereas an information offer service can be certainly regulated to a bypass call.

In this case, the destination exchange system holds an information offer service display on subscriber data of the destination subscriber 5, receives a signal to which information representing an intelligent network call sent from the ISUP line 7'-3 is added, compares a signal to which information representing the received intelligent network call is added with an information offer service display, judges whether an incoming call is terminated to the destination subscriber 5 according to the comparison result, terminates a call to the destination subscriber 5 based on the judged result, forms a signal to which information representing an intelligent network call is added as a dummy information signal representing originating subscriber information, and terminates an incoming call to the destination subscriber 5 in response to the dummy information signal. Thus the realization of the above-mentioned effect can be further improved.

(b) First Embodiment

Next the first embodiment according to the present invention will be described below with reference to the attached drawings.

Figure 2:
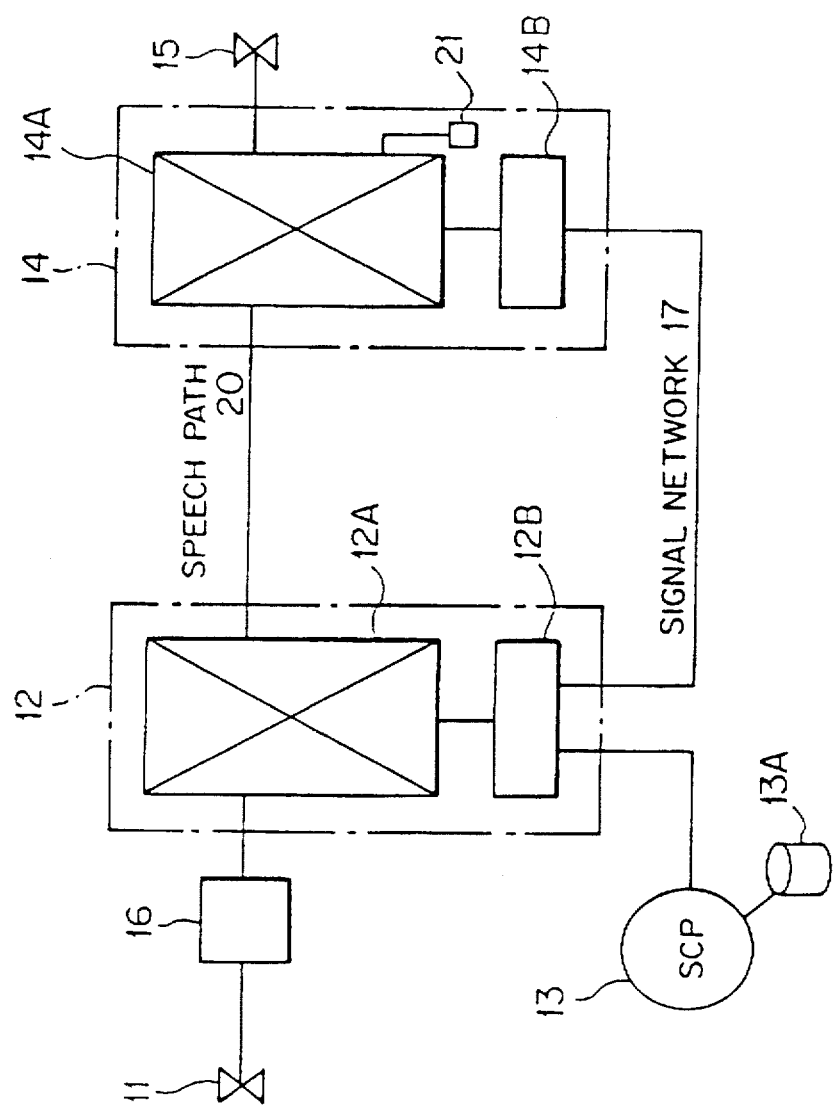
FIG. 2 is a block diagram showing a rough configuration of the first embodiment according to the present invention.

FIG. 2 is a block diagram illustrating the rough configuration of the first embodiment of the present invention. The intelligent network, shown in FIG. 2, includes an originating subscriber 11, an originating station (originating switching unit) 16, a SSP office 12 acting as a service switching point (service switching unit), a SCP office 13 acting as a service control point (service control unit), a destination station (destination switching unit) 14, and a destination subscriber 15 having an information offer service. The SSP 12 is connected to the destination station 14 via the signal network 17.

Figure 3:
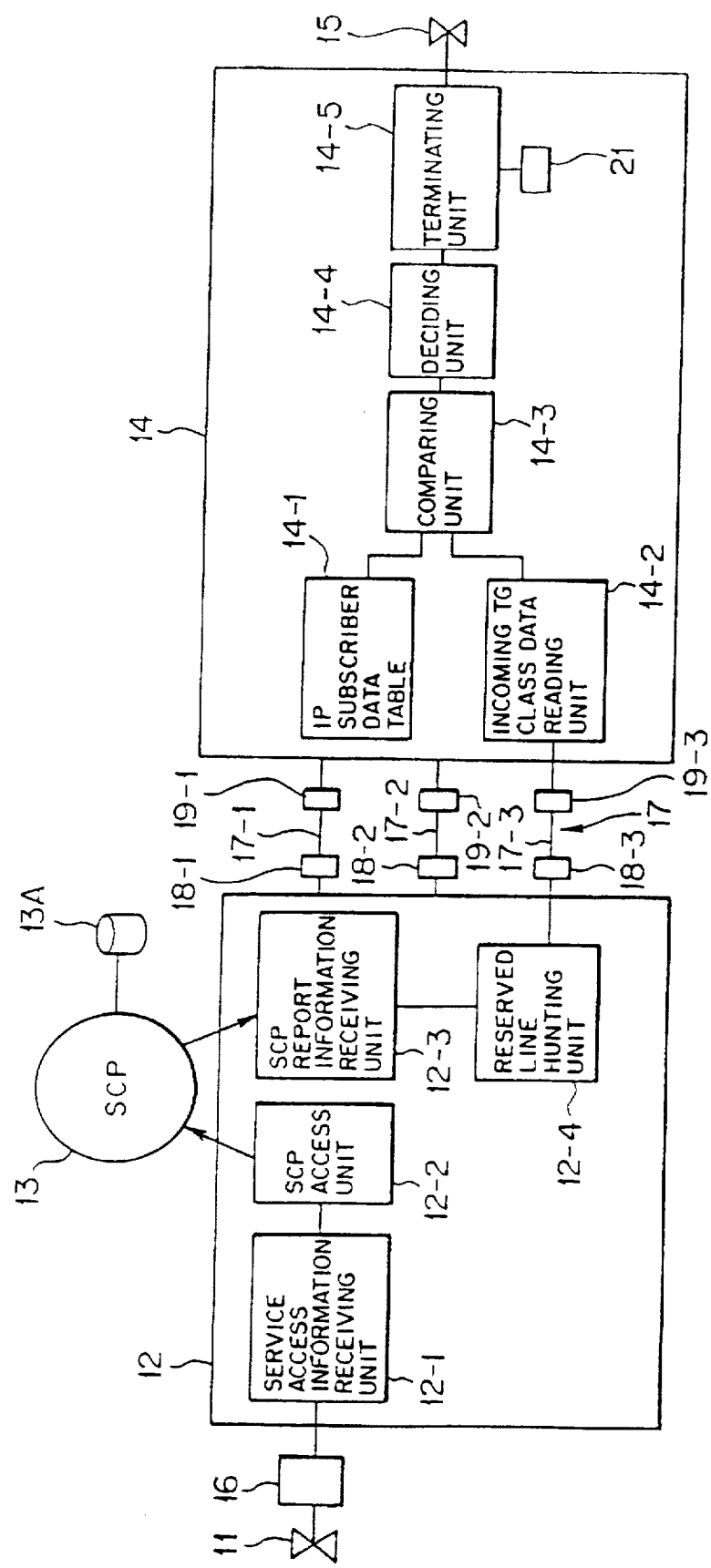
FIG. 3 is a block diagram showing the first embodiment according to the present invention.

The signal network 17, as shown in FIG. 3, is formed of plural signal lines 17-1 to 17-3, or MFC line, TUP line, and ISUP line. The signal lines have one ends connected to outgoing trunks OGT 18-1 to 18-3 and the other ends connected to incoming trunks 19-1 to 19-3, respectively. The MFC relates to the discrete line signal system. The TUP and ISUP relate to the common line signal system. In FIG. 2, numeral 20 represents a speech path.

The originating subscriber 11 is connected to the SSP 12 via the originating station 16. The originating subscriber 11 can accept an information offer service held by the destination subscriber 15 by inputting a service access code SAC.

The originating station 16 which accommodates the originating subscriber 11 analyzes an origination from the origination subscriber 11. If an origination includes the service access code SAC, it is transferred to the SSP 12.

The SSP 12 accesses the SCP 13 in response to the service access code SAC input by the originating subscriber 11, and hunts information offer service-only signal route 17-3 in response to a service process result from the SCP 13. Then the SSP 12 outputs a signal which makes the destination subscriber 15 receive an incoming call to the destination station 14 which holds the destination subscriber 15 having an information offer service. Hence, the SSP 12 which includes a switching unit 12A and a control unit 12B has a switching function. The signal control system, as shown in FIG. 3, consists of a service information receiving unit 12-1, a SCP access unit 12-2, a SCP report information receiving unit 12-3, and a reserved line hunting unit (hunting means) 12-4.

The service information receiving unit 12-1 receives the service access code SAC from the originating subscriber 11. The SCP access unit 12-2 accesses the SCP 13 according to service access code SAC received in the service information receiving unit 12-1. The SCP report information receiving unit 12-3 receives a service process result (conversion telephone number) from the SCP 13.

When the SCP report information receiving unit 12-3 receives a service process result from the SCP 13, the reserved line hunting unit 12-4 hunts the information offer service-only signal route 17-3.

When the SSP 12 accesses according to the service access code SAC from the originating subscriber 11, the SCP 13 accesses the database 13A, thus converting a telephone number (a number dialed by a subscriber) received from the SSP 12 into an actual destination number. If the conversion is allowable OK, the converted telephone number is reported to the SSP 12.

The destination station 14 accommodates the destination subscriber 15 that provides an information offer service according to a request from the originating subscriber 11 and transmits a signal from the SSP 12 input from the SSP 12 via the incoming trunk 19-3 accommodating the information offer service-only signal route 17-3, to the destination subscriber 15. The destination office 14 which includes a switching unit 14A and a control unit 14B has a switching function. The signal control system, as shown in FIG. 3, includes an IP subscriber data table 14-1, an incoming TG class data reading unit 14-2, a comparing unit (comparing means) 14-3, a deciding unit (deciding means) 14-4, and terminating unit (terminating means) 14-5. The destination station 14 also includes a tone connecting unit 21 that outputs tone such as a congestion tone CT.

Figure 4:
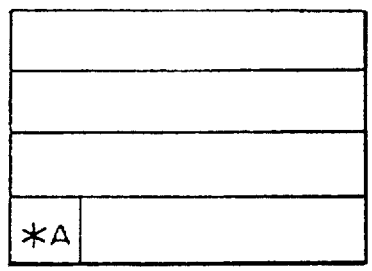
FIG. 4 is a diagram used for explaining the structure of destination subscriber data.

The IP subscriber data table 14-1 holds a display (refer to *A in FIG. 4) of the presence or absence of an information offer service regulation arranged on the subscriber data IPD (refer to FIG. 4) of the destination subscriber 15. The display *A being "1" means the presence of an information offer service regulation. The display *A being "0" means the absence of an information offer service regulation.

Figure 5:
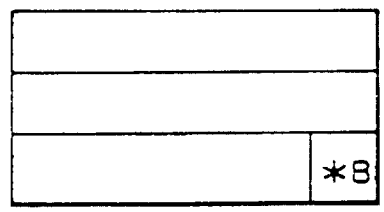
FIG. 5 is a diagram used for explaining an incoming trunk group class data structure.

The incoming TG class data reading unit 14-2 reads an information offer service access display (refer to *B in FIG. 5) on the class data TGCD (refer to FIG. 5) arranged of the incoming trunk 19-3. The information offer service access display *B is displayed for the reserved line route 17-3. "1" means an accepted information offer service. "0" means a not-accepted information offer service.

The comparing unit 14-3 compares the information offer service-only access display *B with the information offer service regulation presence/absence display *A in response to an incoming call using the information offer service-only signal route 17-3. The deciding unit 14-4 decides whether to terminate an incoming call to the destination subscriber 15 according to the comparison result from the comparing unit 14-3. In concrete, when the comparison result from the comparing unit 14-3 is "1" indicating a coincidence of the two inputs, it is decided that an incoming call is terminated to the destination subscriber 15. If not so, it is decided that an incoming call is not accepted (rejected) to the destination subscriber 15.

The terminating unit 14-5 terminates an incoming call to the destination subscriber 15 based on the decision result from the deciding unit 14-4. When the deciding unit 14-4 decides to terminate an incoming call to the destination subscriber 15, the IN call is terminated to the destination subscriber 15. If it is decided that an incoming call is not accepted to the destination subscriber 15, the destination unit 14-5 is connected to the tone connection unit 21.

The above-mentioned configuration according to the first embodiment executes a flexible routing service (FRS) will be functionally described as an example.

FRS adopts the following three kinds of charging systems. For example, the telephone numbers "1800", "1801", and "1900" are service access codes, respectively. "1800" represents no charge. "1801" represents a normal charge. "1900" represents an additional charge.

Figure 6:
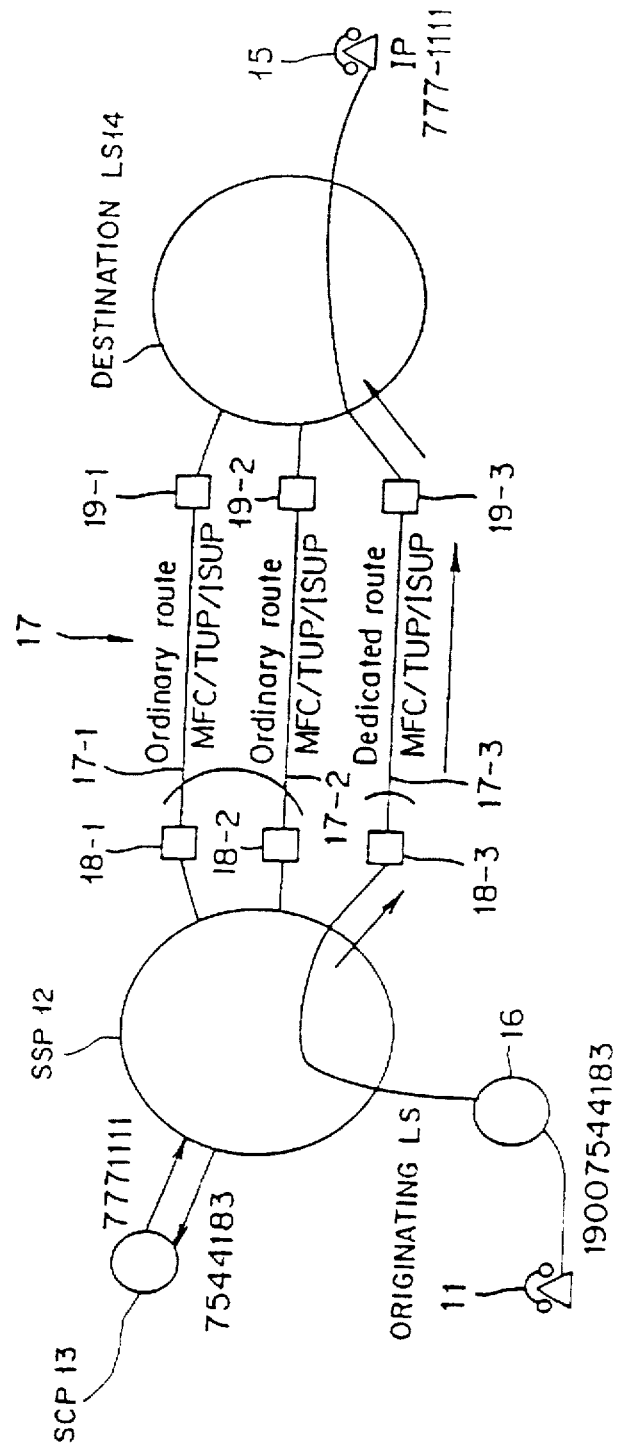
FIG. 6 is a block diagram used for explaining an example of a normally received call in the first embodiment of the present invention.

First, an example in which an IN call is normally terminated to the IP (destination subscriber) 15 will be described by referring to FIGS. 6 and 8.

As described above, '*A=1 (1: with regulation)' is set to the subscriber data of the destination subscriber 15 having an information offer service subject to an additional charge.

When receiving a service subject to an additional charge, the originating subscriber 11 dials a service access code SAC "1900"+DN (DN: telephone number e.g. 754-4183). Then the originating station 16 implements an origination analysis and a numerical translation and further sends a service access code to the SSP 12.

When recognizing the service access code as an IN call, the SSP 12 makes an inquiry by sending ("1900"+DN) to the SCP 13.

The SCP 13 accesses the database 13A and then converts the telephone number (the number dialed by a subscriber) received from the SSP station 12 into an actual destination number (777-1111). If the conversion is valid (OK), the converted telephone number is acknowledged to the SSP 12.

The SSP 12 receives the destination telephone number converted by the SCP 13. If the call is an additional rate call, the SSP 12 hunts the outgoing trunk 18-3 of the exclusive signal route 17-3 to issue a destination request to the destination station 14.

In this case, the access display to an incoming trunk group class data (incoming TG class data) information offer service of the incoming trunk 19-3 connected to the additional rate-only route 17-3 is set as "1(accepted)". Hence since both the IP display value *A and an incoming TG class data value *B coincide with "1" in a comparison and decision process in the terminating office 14, the decision result becomes valid (OK) so that the incoming call can be terminated to the IP 15.

Figure 8:
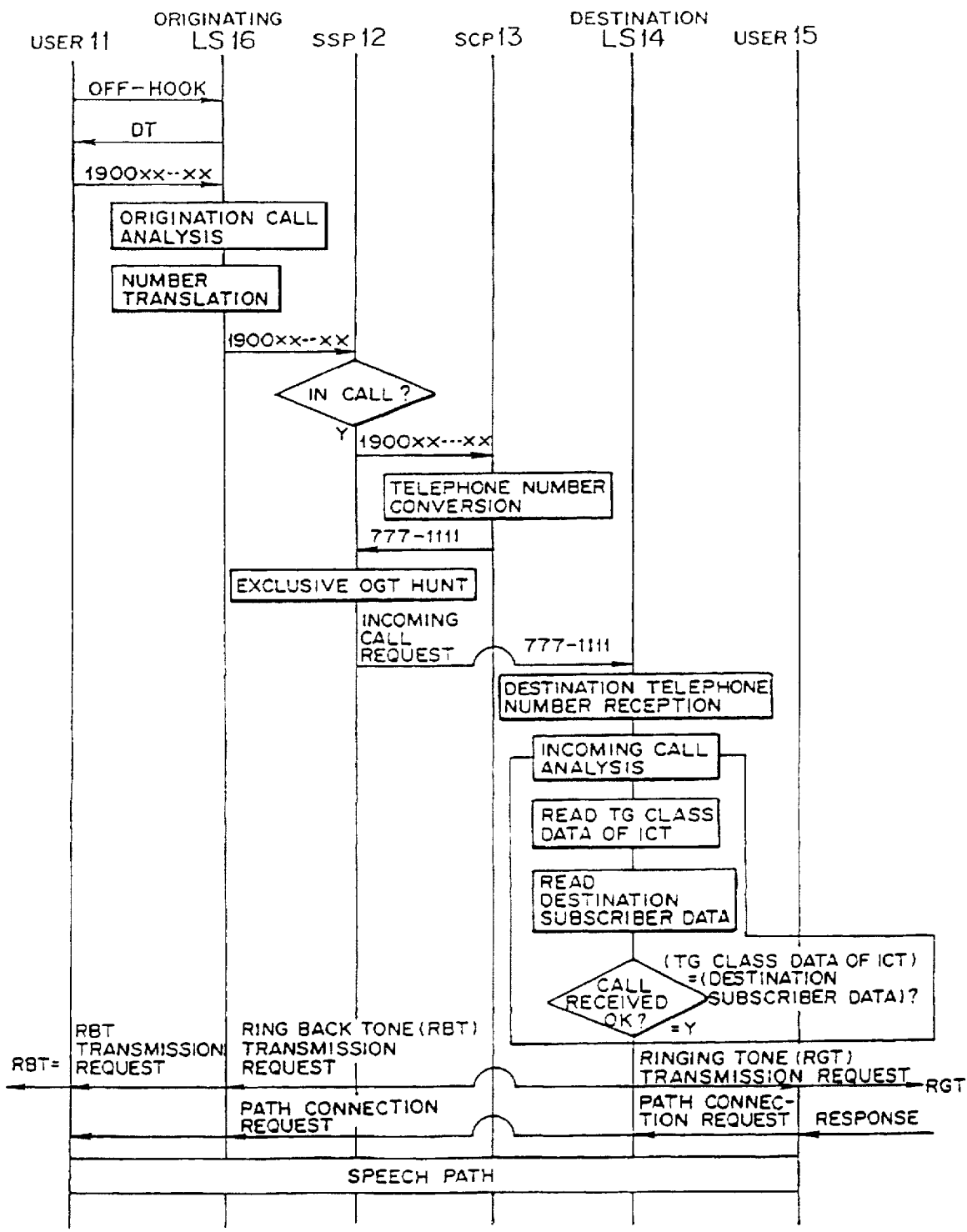
FIG. 8 is a signal sequence chart used for explaining an example of a normally received call in the first embodiment according to the present invention.

The signal sequence is shown in FIG. 8.

The originating subscriber 11 can receive an additional rate information offer service.

Figure 7:
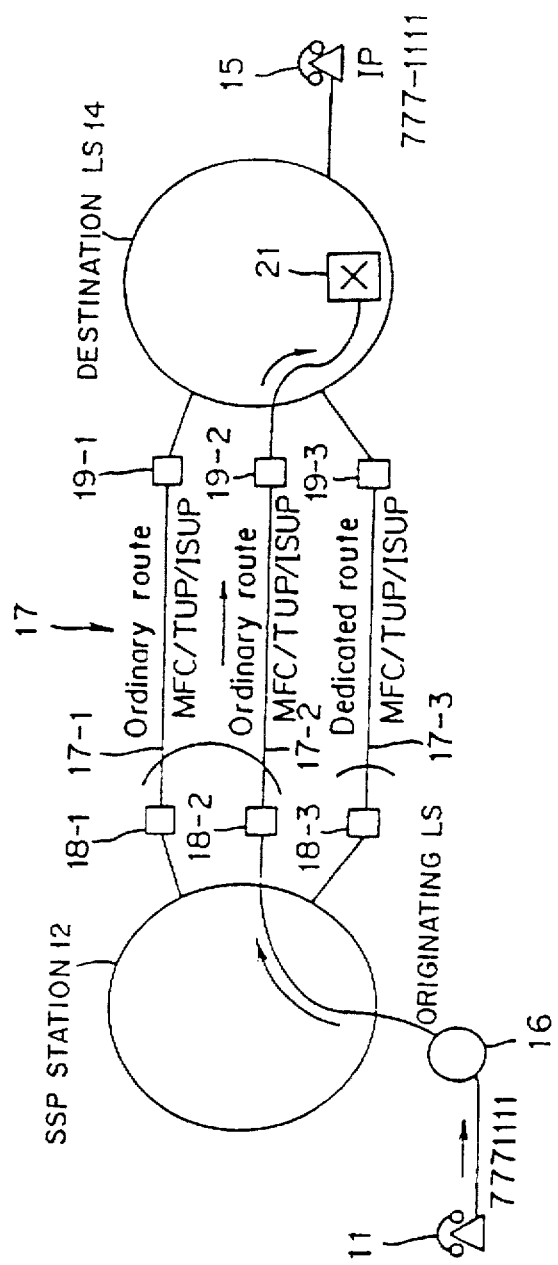
FIG. 7 is a block diagram used for explaining an example of a regulated call in the first embodiment of the present invention.

Next, explanation will be made as to an example of an IN call to the IP (destination provider) 15 regulated with reference to FIGS. 7 and 9.

In other words, when an originating subscriber 11 dials directly the converted telephone number (777-1111) of the IP 15 subject to an additional rate without the service access code SAC, the originating station 16 implements an origination analysis and a numerical translation and then transmits the resultant information to the SSP station 12. However, the SSP 12 does not recognize the information as an IN call but recognizes it as a normal call. Hence an incoming call request is sent to the destination station 14 via the ordinary route 17-1 or 17-2 other than the information offer service-only signal route 17-3.

In the destination station 14, since the access display *B to an information offer service is set to "0" (not-accepted), the incoming TG class data at the incoming trunk 19-1 or 19-2 used in the ordinary route 17-1 or 17-2 disagrees in comparison with the IP display *A (=1: IP's DN with the screening facility) included on the subscriber data of the IP 15 in the destination office 14, thus issuing no good (NG). Hence, the tone connecting unit 21 is connected to send a congestion tone CT, without terminating a call to the IP 15 subjected to an additional rate.

Figure 9:
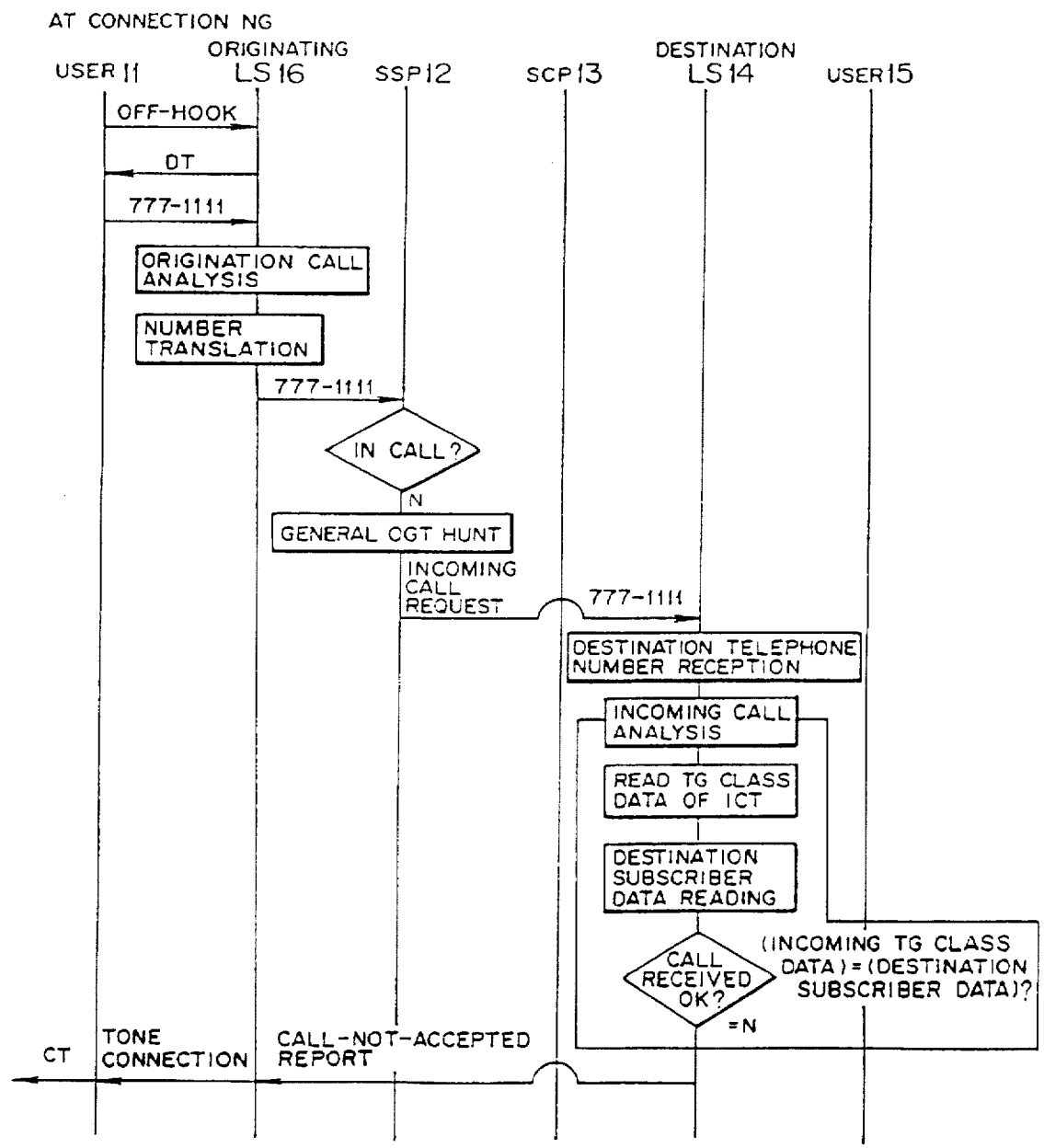
FIG. 9 is a signal sequence chart used for explaining an example of a regulated call in the first embodiment according to the present invention.

The signal sequence in the above-mentioned step is shown in FIG. 9.

In such a manner, even if the originating subscriber 11 dials the converted telephone number of the IP 15 subject to an additional rate without a service access code SAC, a call cannot be accepted for an additional rate information offer service, without imposing an additional charge. This means that a bypass call for an information offer service can be certainly regulated.

That is, according to the first embodiment, with an IP (information provider) display arranged on the subscriber data of the information offer subscriber 15 and an information offer service access display arranged on the incoming TG class data, the destination station 14 checks the display and decides whether the display relates to a special service accepted call. Thus, it is inhibited that the originating subscriber 11 terminates a call to the IP 15 without dialing a service access code for the special information offer service. As a result, it can be prevented that a special information offer service is accepted for only a normal charge, without an additional charge.

In the first embodiment, a call may be input directly from the originating subscriber 11 to the SSP 12 without relaying the originating station 16. In this case, the SSP 12 implements an originating analysis and a numerical translation.

(c) Second Embodiment

Next, the second embodiment of the present invention will be described below with reference to the attached drawings.

Figure 10:
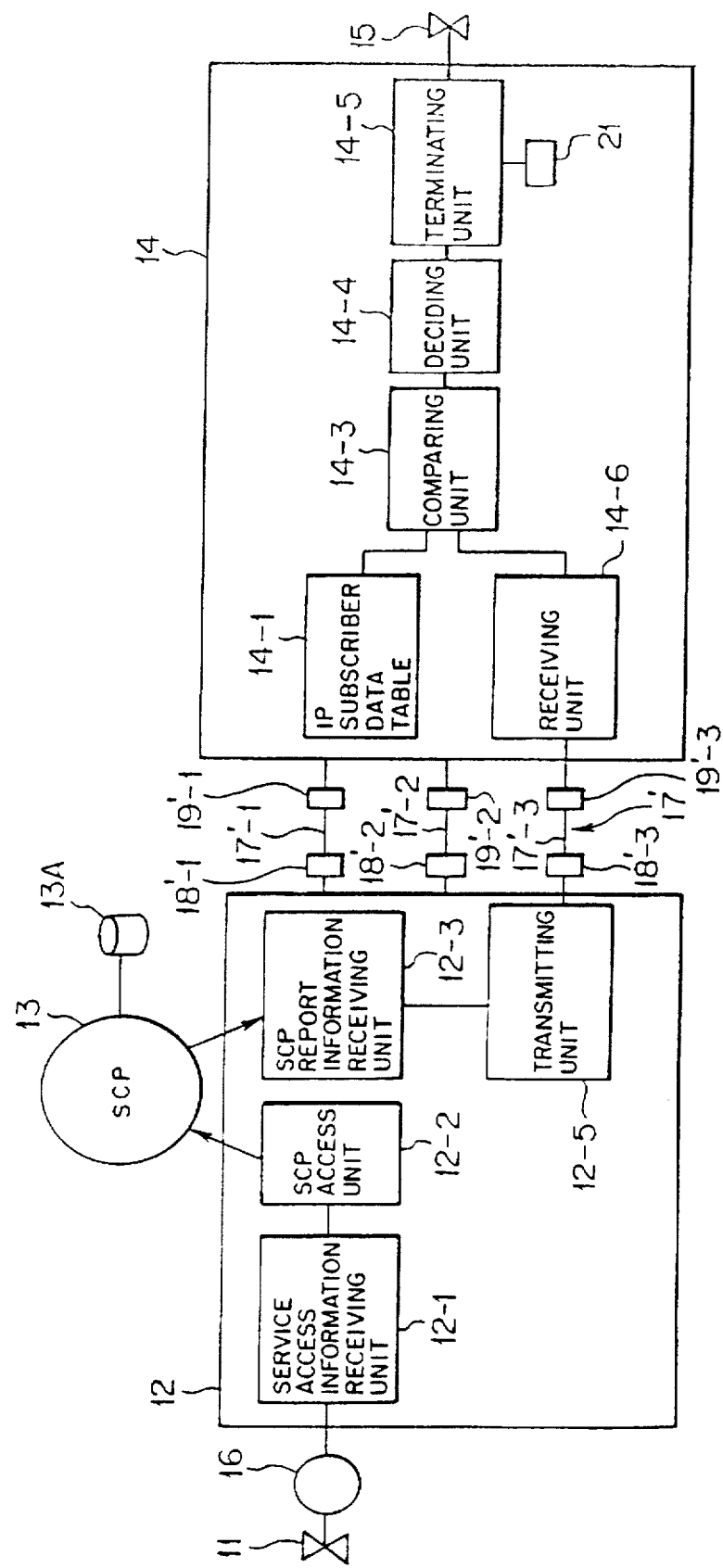
FIG. 10 is a block diagram illustrating the second embodiment according to the present invention.

FIG. 10 is a block diagram showing the second embodiment according to the present invention. In the second embodiment shown in FIG. 10, the intelligent network includes an originating subscriber 11, an originating station 16, a SSP 12 acting as a service switching (service switching unit), a SCP 13 acting as a service control point (service control unit), a destination station (destination switching unit) 14, and a destination subscriber 15 having an information offer service. The SSP 12 is connected to the destination station 14 via the signal network 17'.

The signal network 17' consists of plural signal lines 17'-1 to 17'-3. For example, the signal line 17'-1 is formed of a MFC. The signal line 17'-2 is formed of a TUP. The signal line 17'-3 is formed of an ISUP line. The signal lines have one ends connected to outcoming trunks (OGTs) 18'-1 to 18'-3 and the other ends connected to incoming trunks (ICTs) 19'-1 to 19'-3, respectively. Because the signal network is here a main subject, the speech path is omitted in FIG. 10.

The originating subscriber 11, the originating station 16, and the SCP 13 correspond to those in the first embodiment described above. Hence the duplicate explanation will be omitted here.

Figure 11:
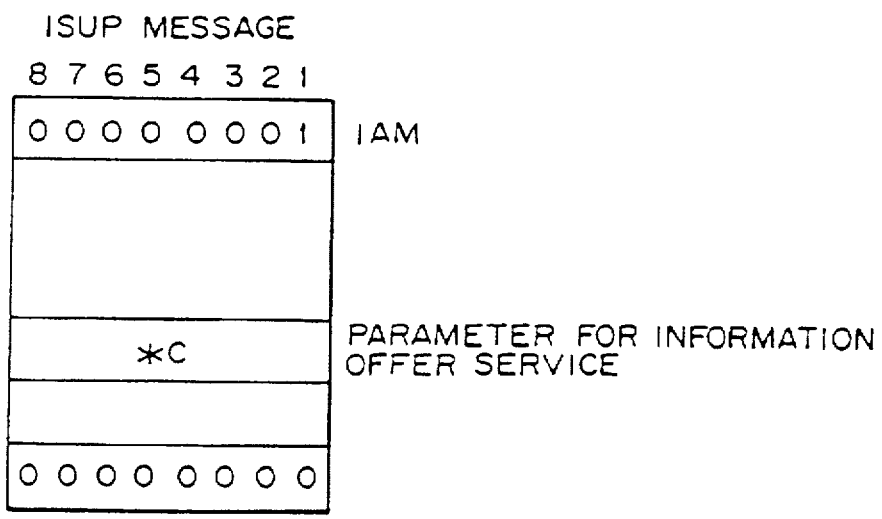
FIG. 11 is a diagram used for explaining an ISUP message.

The SSP 12 accesses the SCP 13 when the originating subscriber 11 receives the service access code SAC input; then adapts to the ISUP line 17'-3 in response to a service process result from the SCP station 13; transmits a signal (IN call information added signal) to which information (a parameter for an information offer service) *C representing an IN call or non IN call is added to an ISUP message, as shown in FIG. 11; and outputs a signal which terminates an incoming call to the destination subscriber 15, to the destination station 14 holding the destination subscriber 15 having an information offer service. For that reason, the SSP 12 has the configuration similar to that in FIG. 2 or includes the switching unit 12A and the control unit 12B, thus having a switching function. As shown in FIG. 10, the signal control system includes a service information receiving unit 12-1, a SCP access unit 12-2, a SCP report information receiving unit 12-3, and a transmitting unit (transmitting means) 12-5.

In the case of need (presence) of an information offer service, the information offer service parameter *C is "1". In the case of no need (absence) of an information offer service, the information offer service parameter *C is "0".

The service information receiving unit 12-1, the SCP access unit 12-2, and the SCP report information receiving unit 12-3 correspond to those in the first embodiment. Hence the duplicate explanation will be omitted here.

When the SCP report information receiving unit 12-3 receives a service process result from the SCP 13, the transmitting unit 12-5 adapts to the ISUP line 17'-3, transmits an IN call information added signal, and outputs the signal transmitted to the destination subscriber 15, to the destination station 14 holding a destination subscriber 15 providing an information offer service.

The destination station 14 accommodates a destination subscriber 15 which provides an information offer service in response to a request from the originating subscriber 11, and terminates an IN call information added signal to the destination subscriber 15 when the IN call information added signal includes information regarding the need (presence) of an information offer service. The destination station 14 has the configuration similar to that in FIG. 2, or the switching function processed by the switching unit 14A and the control unit 14B. The signal control system, as shown in FIG. 10, consists of an IP subscriber data table 14-1, a receiving unit 14-6, a comparing unit (comparing means) 14-3', a deciding unit (deciding means) 14-4, and a destination unit (destination means) 14-5. The destination station 14 includes a tone connecting unit 21.

The IP subscriber data table 14-1 corresponding to that in the first embodiment holds the presence/absence display (refer to FIG. 4) of regulation of an information offer service arranged on the subscriber data IPD of the destination subscriber 15.

The receiving unit 14-6 receives an IN call information added signal sent through the ISUP line 17'-3. The comparing unit (comparing means) 14-3 compares the information offer service parameter *C of an IN call information added signal received in the receiving unit 14-6 with the information offer service display *A. The deciding unit 14-4 decides whether an incoming call is established to the destination subscriber 15 according to the comparison result in the comparing unit 14-3. In concrete, if or when the two comparison results of the comparing unit 14-3 agree to "1", it is decided that an incoming call is terminated to the destination subscriber 15. If not so, it is decided that an incoming call is inhibited to the destination subscriber 15.

The destination unit 14-5 terminates the call to the destination subscriber 15 based on the decision result of the deciding unit 14-4. When the deciding unit 14-4 decides an incoming call terminated to the destination subscriber 15, it transmits an IN call to the destination subscriber 15. If the deciding unit 14-4 decides a call refusal to the destination subscriber 15, it is connected to the tone connecting unit 21.

The above-mentioned configuration according to the second embodiment executes a flexible routing service (FRS) will be functionally described as an example.

The second embodiment adopts the following three kinds of charging systems for example, telephone numbers as service access codes "1800 (no charge)", "1801 (normal charge)", and "1900 (additional charge)".

Figure 12:
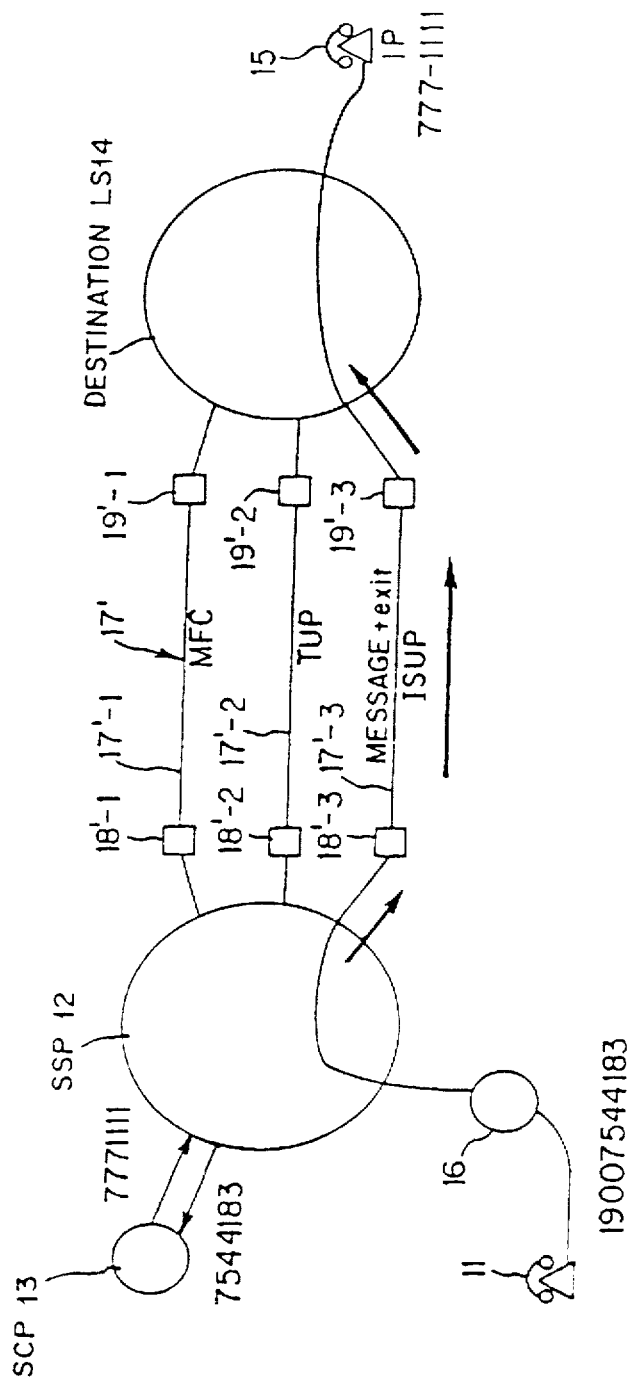
FIG. 12 is a block diagram used for explaining an example of a normally received call in the second embodiment of the present invention.

The example where an IN call is normally terminated to the IP (designation subscriber) 15 will be described by referring to FIGS. 12 and 14.

As described above, even in this embodiment, '*A=1 (1: with regulation)' is set to the subscriber data of the subscriber 15 having an information offer service subject to an additional charge.

Where the originating subscriber 11 receives an additional charge service, he dials a service access code SAC "1900"+ DN (DN: a telephone number e.g. 754-4183). Thus the originating station 16 performs an origination analysis and a numerical translation and then transmits a service access code to the SSP 12.

When the SSP station 12 recognizes the IN call, it transmits ("1900"+DN) to make an inquiry to the SCP 13.

The SCP 13 accesses the database 13A and then converts the telephone number (a number dialed by the subscriber) received from the SSP 12 into an actual destination number (777-1111). If the conversion is valid OK, the converted telephone number is notified the SSP 12.

The SSP 12 receives the converted telephone number from the SCP 13. If the call is an additional rate call, the outgoing trunk 18'-3 of the ISUP line 17'-3 is hunted. A parameter *C (=1: exist) showing an additional rate is added to the message in ISUP line. Then the resultant information is sent to the destination station 14.

In the destination station 14, the value *A in the IP 15 is compared with the added parameter value *C (exist: accepted) in the message. Because the two values are respectively "1", the decision result becomes valid OK, thus terminating a call to the IP 15.

Figure 14:
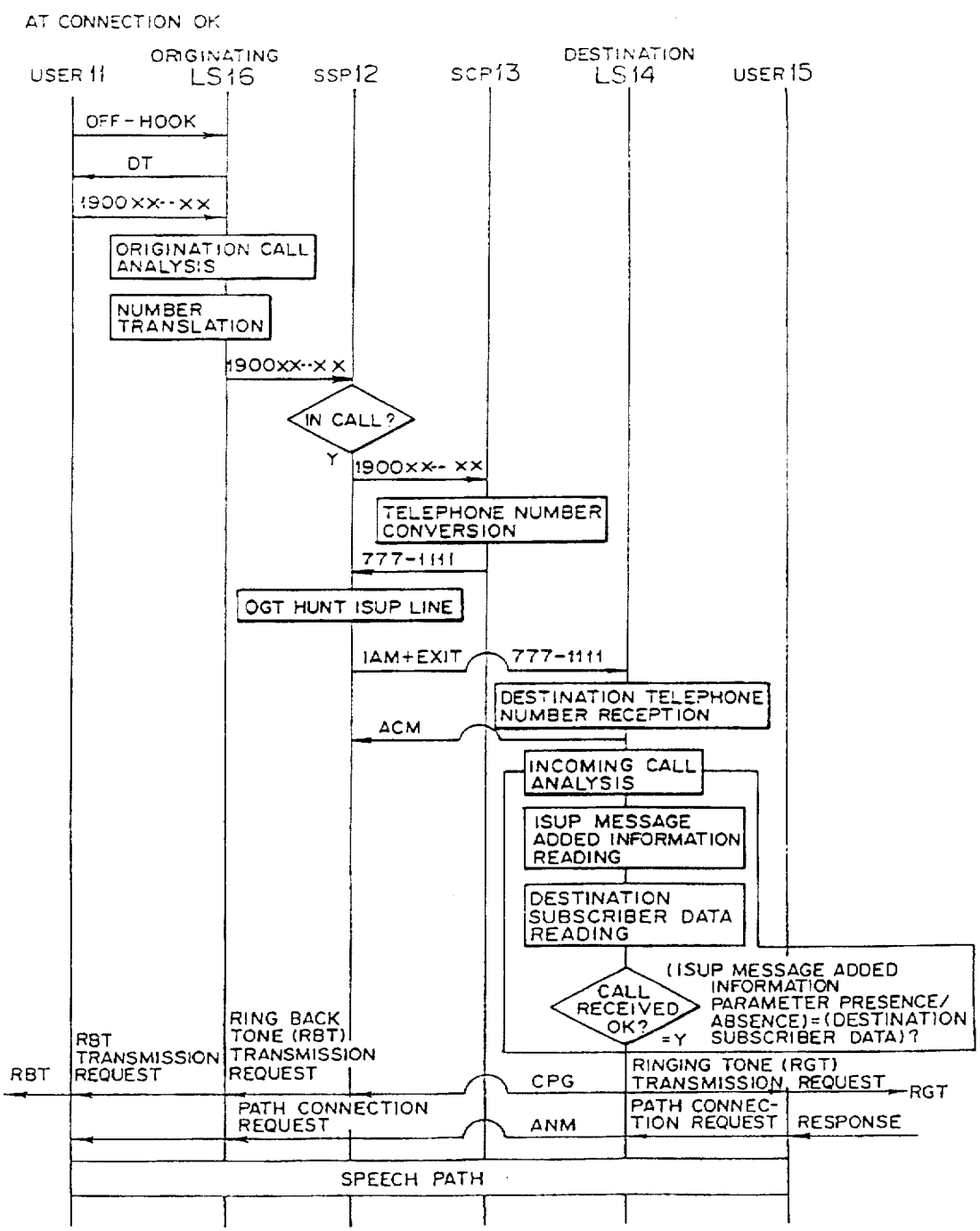
FIG. 14 is a signal sequence chart used for explaining an example of a normally received call in the second embodiment of the present invention.

The signal sequence is shown in FIG. 14.

The originating subscriber 11 can receive an information offer service subject to an additional rate.

Figure 13:
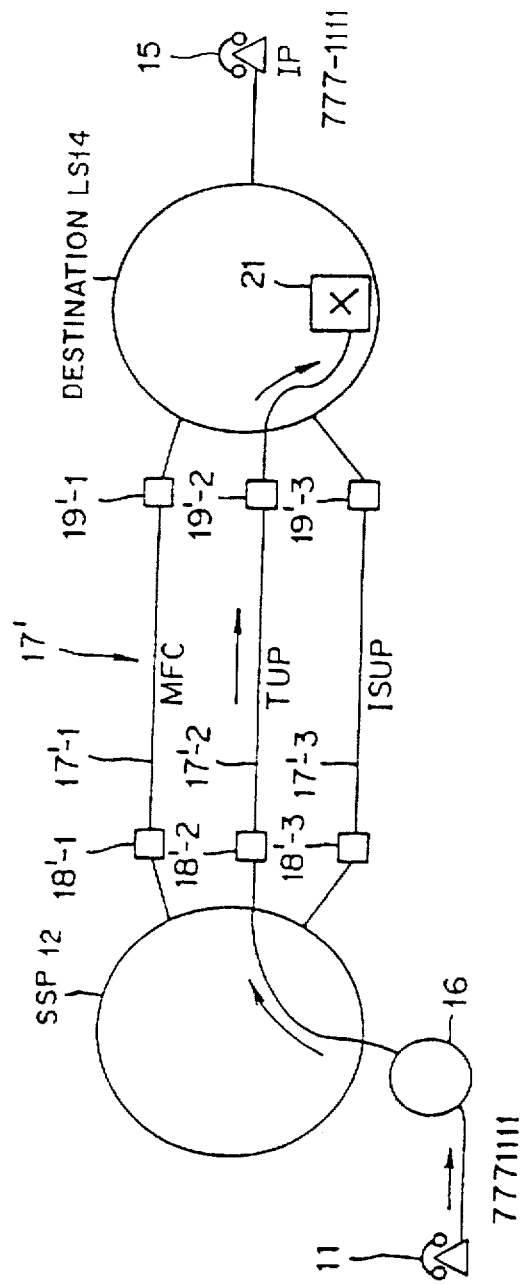
FIG. 13 is a block diagram used for explaining an example of a regulated call in the second embodiment of the present invention.

Next the example where an IN call to the IP (destination subscriber) 15 is regulated will be described by referring to FIGS. 13 and 15.

That is, even if the originating subscriber 11 dials directly the converted telephone number (777-1111) of the IP 15 subject to an additional rate, without a service access code SAC, the originating station 16 implements an origination analysis and a numerical translation and then transmits the resultant information to the SSP 12. However, since the SSP 12 does not recognizes the information as an IN call, but recognizes merely it as a normal call, any one of the MFC line 17'-1, the TUP line 17'-2, and the ISUP line 17'-3 can be used. If the ISUP line 17'-3 is used, the parameter *C showing an additional rate added to the ISUP message is set to "0 (not exist)".

Hence even if the destination station 14 receives a signal from any one of the MFC line 17'-1, the TUP line 17'-2, and the ISUP line 17'-3, a comparison result between the signal and the IP display *A (=1:IP's DN with the screening facility) on the subscriber data of the IP 15 in the destination station 14 indicates disagreement or no good (NG). Although the call is not terminated to the IP 15 subject to an additional rate, the selected line is connected to the tone connecting unit 21 to issue a congestion tone.

Figure 15:
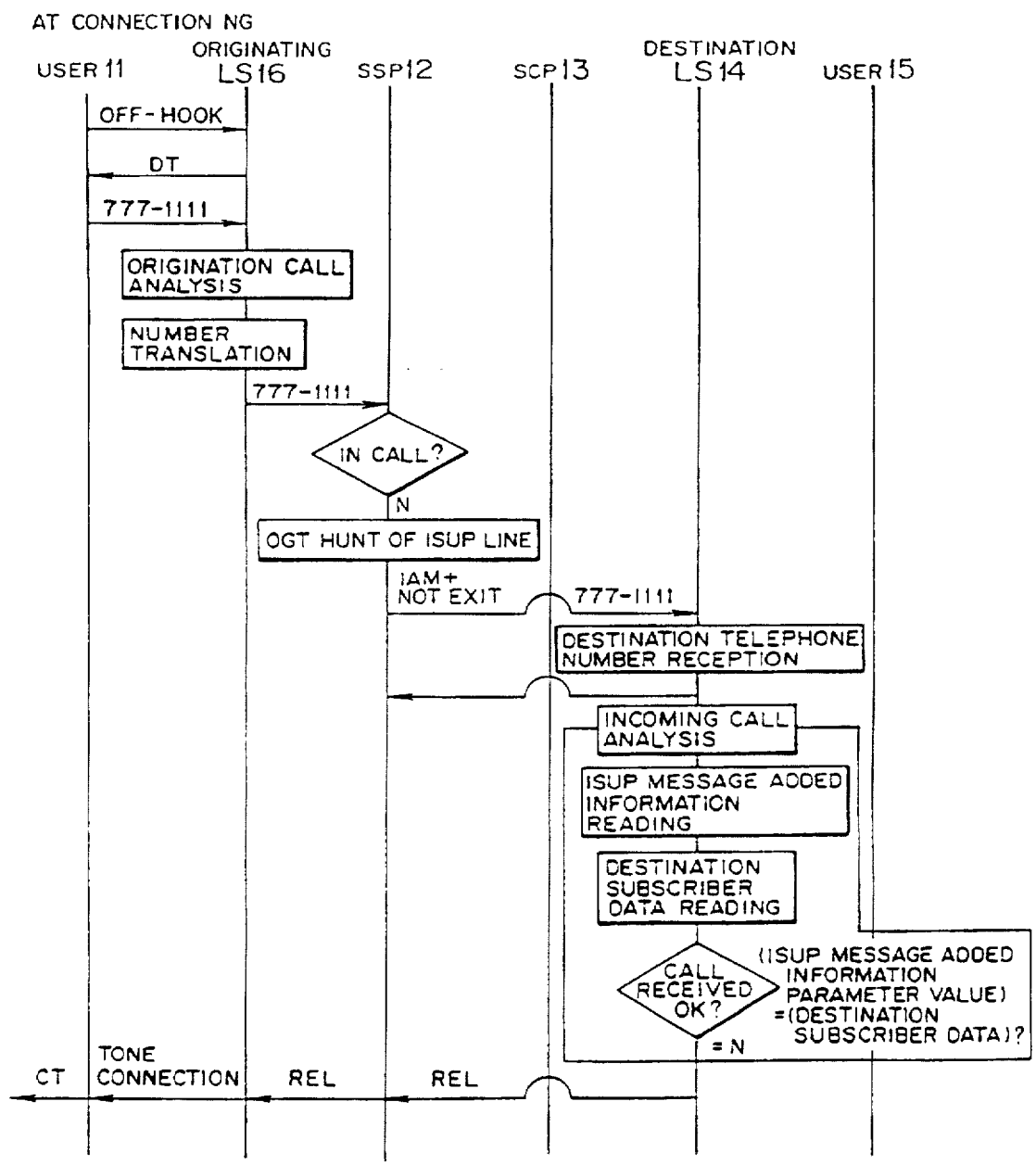
FIG. 15 is a signal sequence chart used for explaining an example of a regulated call in the second embodiment of the present invention.

This signal sequence is shown in FIG. 15.

As described above, even if the originating subscriber 11 dials directly the converted telephone number of the IP 15 subject to an additional rate with no service access code SAC, he cannot enjoy an additional rate information offer service, without adding an additional charge to the call. This means that a bypass call for an information offer service can be surely regulated.

In other words, according to the second embodiment, an IP (information provider) indication is carried on the subscriber data of the information offer subscriber 15 and an information offer service parameter is added to the ISUP message at a special information offer service access time. Thus, the destination office 14 checks the indication, and decides whether a call is a special service accepted call. It can be regulated that the originating subscriber 11 terminates a call to the IP 15 without dialing a service access code for a special information offer service. It can be certainly prevented that the special information offer service is received in exchange for only a normal charge, without adding an added charge.

In the second embodiment, a call may be directly input from the originating subscriber 11 to the SSP 12 via no originating station 16. In this case, the SSP 12 performs an origination analysis and a numerical translation.

(d) Third Embodiment

Next, the third embodiment according to the present invention will be described below with reference to the attached drawings.

Figure 16:
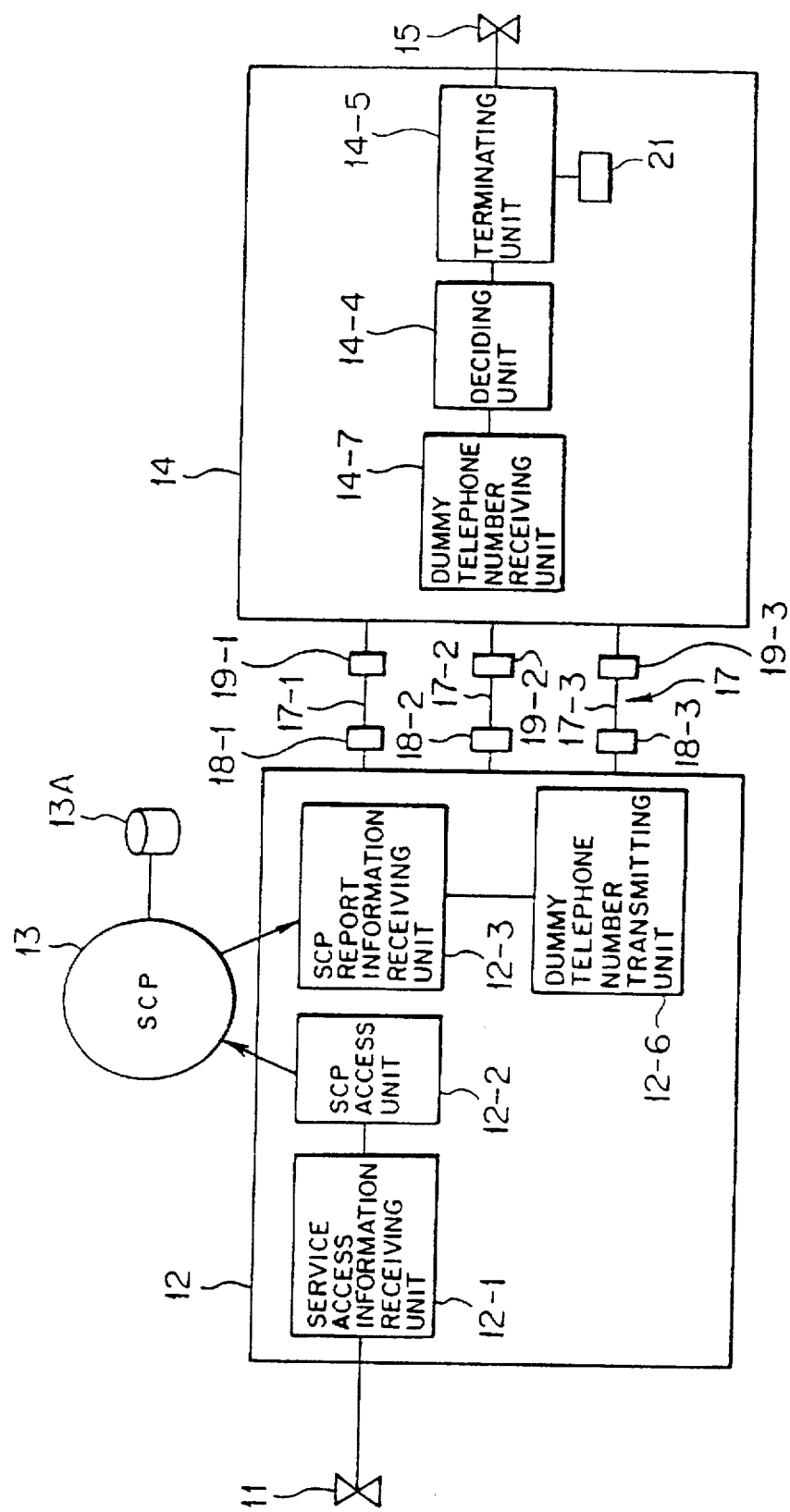
FIG. 16 is a block diagram illustrating the third embodiment according to the present invention.

FIG. 16 is a block diagram illustrating the third embodiment of the present invention. In the third embodiment shown in FIG. 16, the intelligent network includes an originating subscriber 11, a SSP 12 acting as a service switching point (service switching unit), a SCP 13 acting as a service control point (service control unit), a destination station (destination switching unit) 14, and a destination subscriber 15 having an information offer service. The SSP 12 is connected to the destination station 14 via the communication network 17.

The signal network 17 is formed of plural signal lines 17-1 to 17-3. The signal line 17-1 is a MFC line. The signal line 17-2 is a TUP line. The signal line 17-3 is an ISUP line. The signal lines 17-1 to 17-3 have one ends connected to outgoing trunks (OGTs) 18-1 to 18-3 and the other ends connected to incoming trunks (ICTs) 19-1 to 19-3, respectively. Now since attention is paid to the signal network, the speech path is omitted here in FIG. 16.

The originating subscriber 11 and the SCP station 13 correspond to those in the first and second embodiments. Hence the duplicate explanation will be omitted here.

The SSP 12 accesses the SCP 13 in response to service access information SAC input by the originating subscriber 11, transfers a dummy telephone number acting as dummy information representing originating subscriber information in response to a service process result from the SCP station 13, and outputs a signal being terminated to the destination subscriber 15, to the destination station 14 accommodating the destination subscriber 15 providing an information offer service. For that reason, the SSP 12 has the configuration similar to that shown in FIG. 2, or a switching function established with the switching unit 12A and the control unit 12B. However, as shown in FIG. 16, the signal control system consists of a service information receiving unit 12-1, a SCP access unit 12-2, a SCP report information receiving unit 12-3, and a dummy telephone number transmitting unit (transmitting means) 12-6.

The service information receiving unit 12-1, the SCP access unit 12-2, and the SCP report information receiving unit 12-3 are those in the first and second embodiments. Hence the duplicate explanation will be omitted here.

When the SCP report information receiving unit 12-3 receives a service process result from the SCP 13, the dummy telephone number transmitting unit 12-6 transfers a dummy telephone number in addition to a destination telephone number. Then the dummy telephone number transmitting means 12-6 issues a signal which terminates a call to the destination subscriber 15, to the destination station 14 accommodating the destination subscriber 15 having an information offer service.

Figure 19:
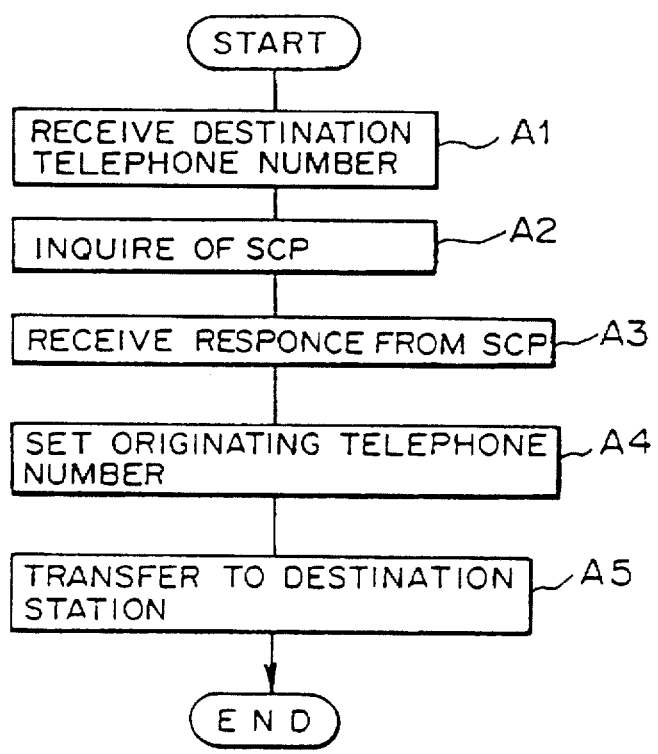
FIG. 19 is a flow chart used for explaining the operation of a SSP station according to the third embodiment of the present invention.

In response to service access information from the originating subscriber 11 (step A1 in FIG. 19), the SSP 12 makes an inquiry to the SCP station 13 (step A2 in FIG. 19). Then when receiving a process result report from the SCP 13 (step A3 in FIG. 19), the SSP 12 sets a dummy telephone number as an originating telephone number (step A4 in FIG. 19), thus transferring it to the destination station 14.

The destination station 14 accommodates the destination subscriber 15 providing an information offer service in response to a request from the originating subscriber 11 and terminates a call to the destination subscriber 15 in response to the dummy telephone number of an originating subscriber. The destination station 14 has the configuration similar to that shown in FIG. 2, or a switching function executed by the switching unit 14A and the control unit 14B. The signal control system, as shown in FIG. 16, includes a dummy telephone number receiving unit 14-7, a deciding unit (deciding means) 14-4, and a destination unit (destination means) 14-5. The destination station 14 includes a tone connecting unit 21.

The dummy telephone receiving unit 14-7 receives a dummy telephone number. The deciding unit 14-4 decides to terminate a call to the destination subscriber 15 when the dummy telephone number receiving unit 14-7 receives a dummy telephone number. If not so, the deciding unit 14-4 decides that a call to the destination subscriber 15 is not accepted.

The destination unit 14-5 terminates a call to the destination subscriber 15 based on a decision result from the deciding unit 14-4. When deciding to terminate a call to the destination subscriber 15, the deciding unit 14-4 terminates an IN call to the destination subscriber 15. When deciding to refuse a call to the destination subscriber 15, the deciding unit 14-4 is connected to the tone connecting unit 21.

Figure 20:
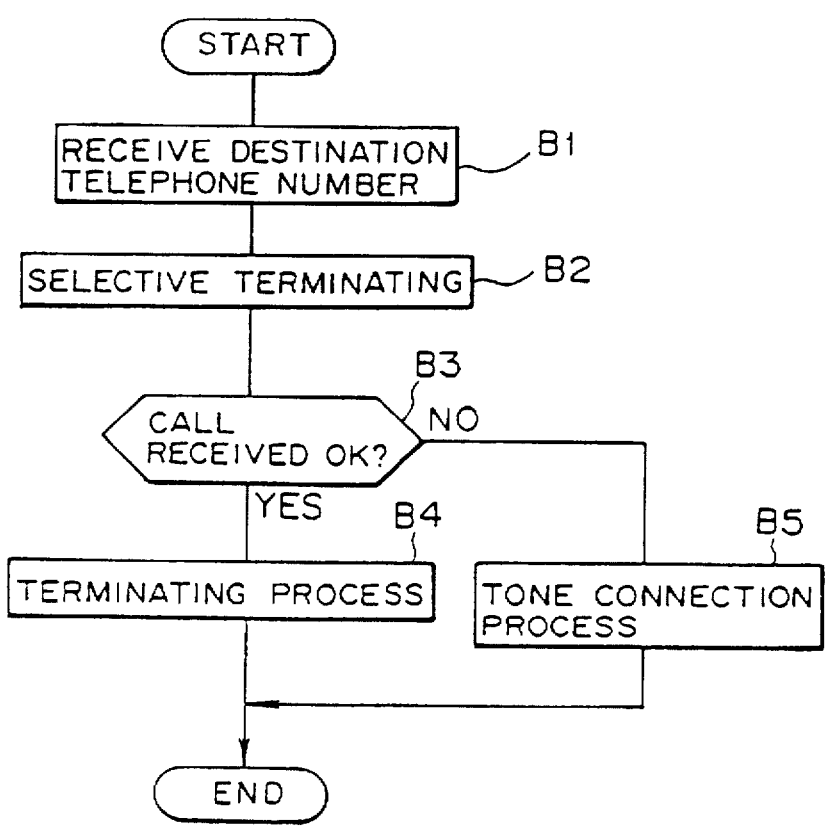
FIG. 20 is a flow chart used for explaining the operation in a destination office according to the third embodiment of the present invention.

When the destination station 14 receives a destination telephone number from the SSP 12 (step B1 in FIG. 20), it decides whether the dummy telephone number has been received (step B2 in FIG. 20: selective incoming call). If yes, the Yes route in the step B3 shown in FIG. 20 is selected to send a call to the destination subscriber 15 (step B4 in FIG. 20). If no, the No route in the step B3 shown in FIG. 20 is selected to connect a call to the tone connecting unit 21 (step B5 in FIG. 20).

The above-mentioned configuration according to the third embodiment executes a flexible routing service (FRS) will be functionally described as an example.

The third embodiment adopts the following three kinds of charging systems: service access codes e.g. "1800 (no charge)", "1801 (normal charge)", and "1900 (additional charge)".

Figure 17:
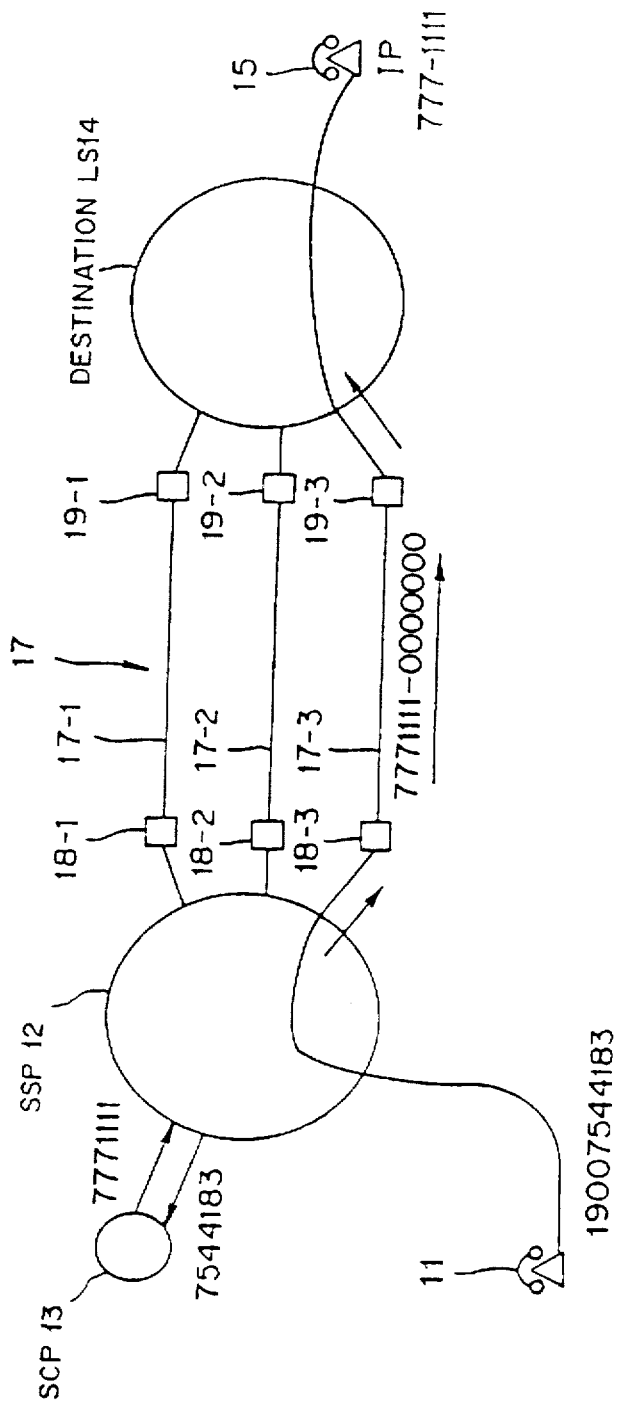
FIG. 17 is a block diagram used for explaining an example of a normally received call in the third embodiment of the present invention.

First, the example where an IN call is normally terminated to the IP (destination subscriber) 15 will be explained with reference to FIGS. 17 and 21.

Where the originating subscriber 11 receives an additional charge service, the service access code SAC "1900"+DN (DN: telephone number, e.g. 754-4183) is dialed. Then the SSP station 12 executes an origination analysis and a numerical translation.

Thereafter, when recognizing an IN call, the SCP 12 sends "1900"+DN to make an inquiry to the SCP station 13.

The SCP 13 accesses the database 13A and then converts the telephone number (number dialed by a subscriber) received from the SSP station 12 into an actual destination number "777-1111". If the conversion is valid OK, the converted telephone number is notified the SSP station 12.

The SSP 12 receives the converted destination telephone number from the SCP 13. If the call is an additional rate call, the SSP 12 converts the originating telephone number "754-4183" into a dummy telephone number (e.g. 000-0000) and then transmits the dummy telephone number plus the destination number to the destination station 14. In this case, the signal line can pass through any one.

The destination station 14 executes a destination analysis. If an originating telephone number converted into a dummy telephone number is found, the decision result becomes valid OK. The destination station 14 terminates a call to the IP 15.

Figure 21:
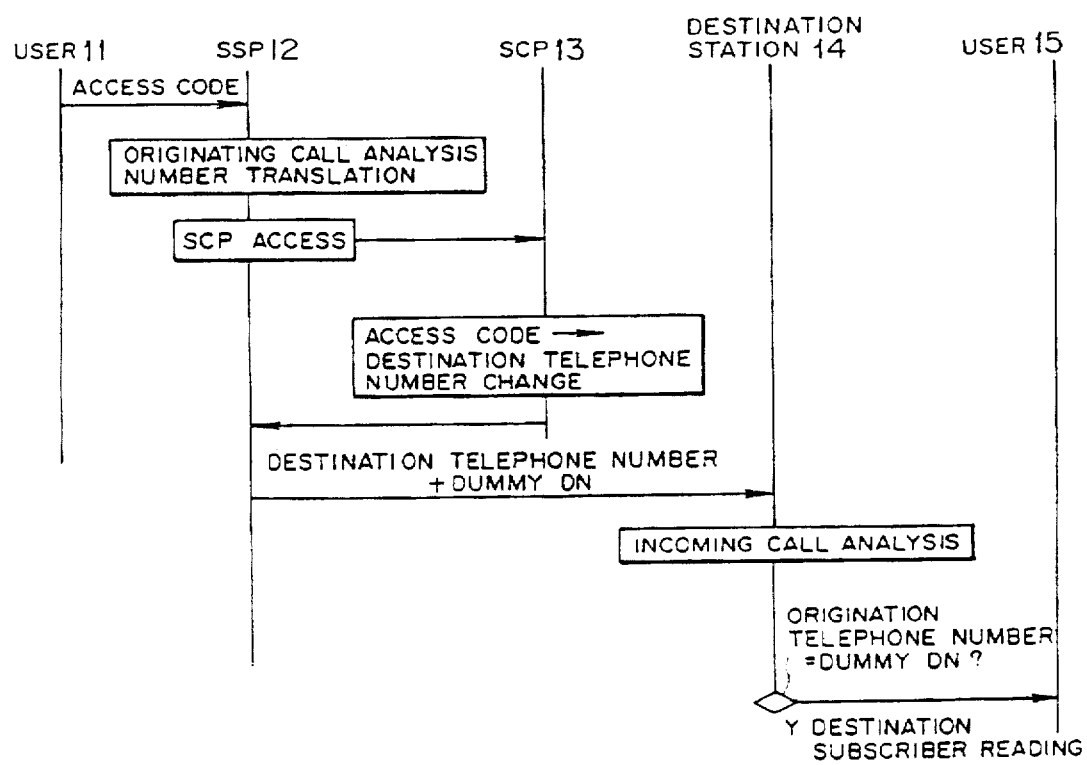
FIG. 21 is a signal sequence chart used for explaining an example of a normally received call in the third embodiment of the present invention.

The signal sequence is shown in FIG. 21.

In this case, the originating subscriber 11 can receive an additional rate information offer service.

Figure 18:
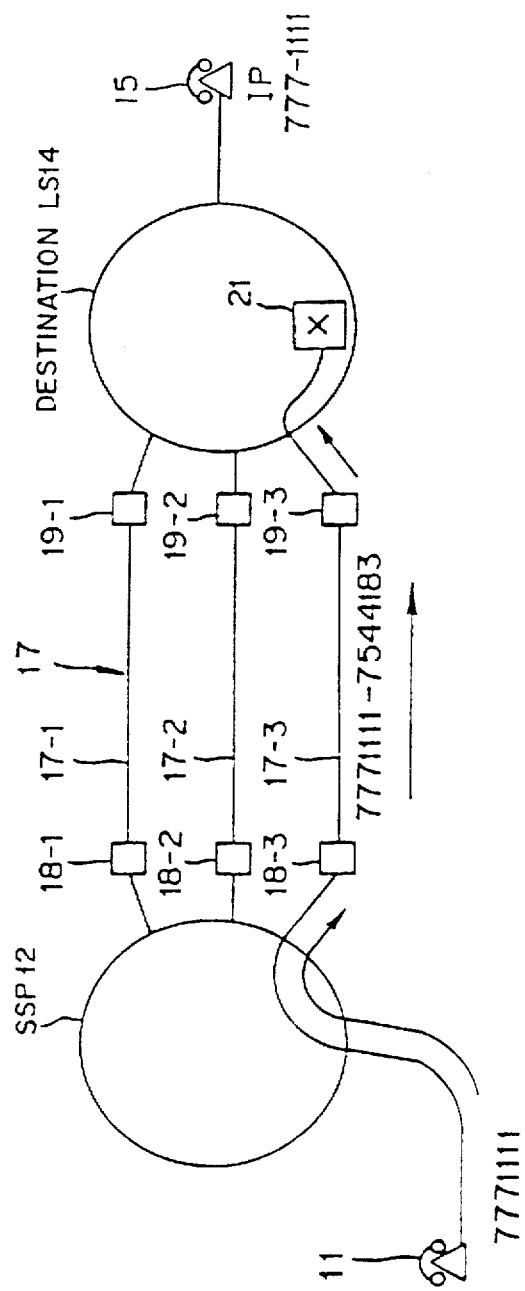
FIG. 18 is a block diagram used for explaining an example of a regulated call in the third embodiment of the present invention.

Next, the example where an IN call to the IP (destination subscriber) 15 is regulated will be described with reference to FIGS. 18 and 22.

Even when the originating subscriber 11 dials directly the converted telephone number "777-1111" of the IP 15 subject to an additional rate, without using a service access code SAC, the originating station 16 executes an origination analysis and a numerical translation, thus sending the resultant information to the SSP 12. However, the SSP station 12 does not recognize the information as an IN call, but recognizes as a normal call. Hence the originating telephone number is not changed, but a destination telephone number added to the originating telephone number is transmitted to the destination station 14.

In this case, in the destination station 14, since a destination analysis finds an originating telephone number not converted into a dummy telephone number, the decision result becomes invalid NG. As a result, a congestion tone CT is sent by connecting to the tone connecting unit 21, without terminating a call subject to an additional rate to the IP 15.

Figure 22:
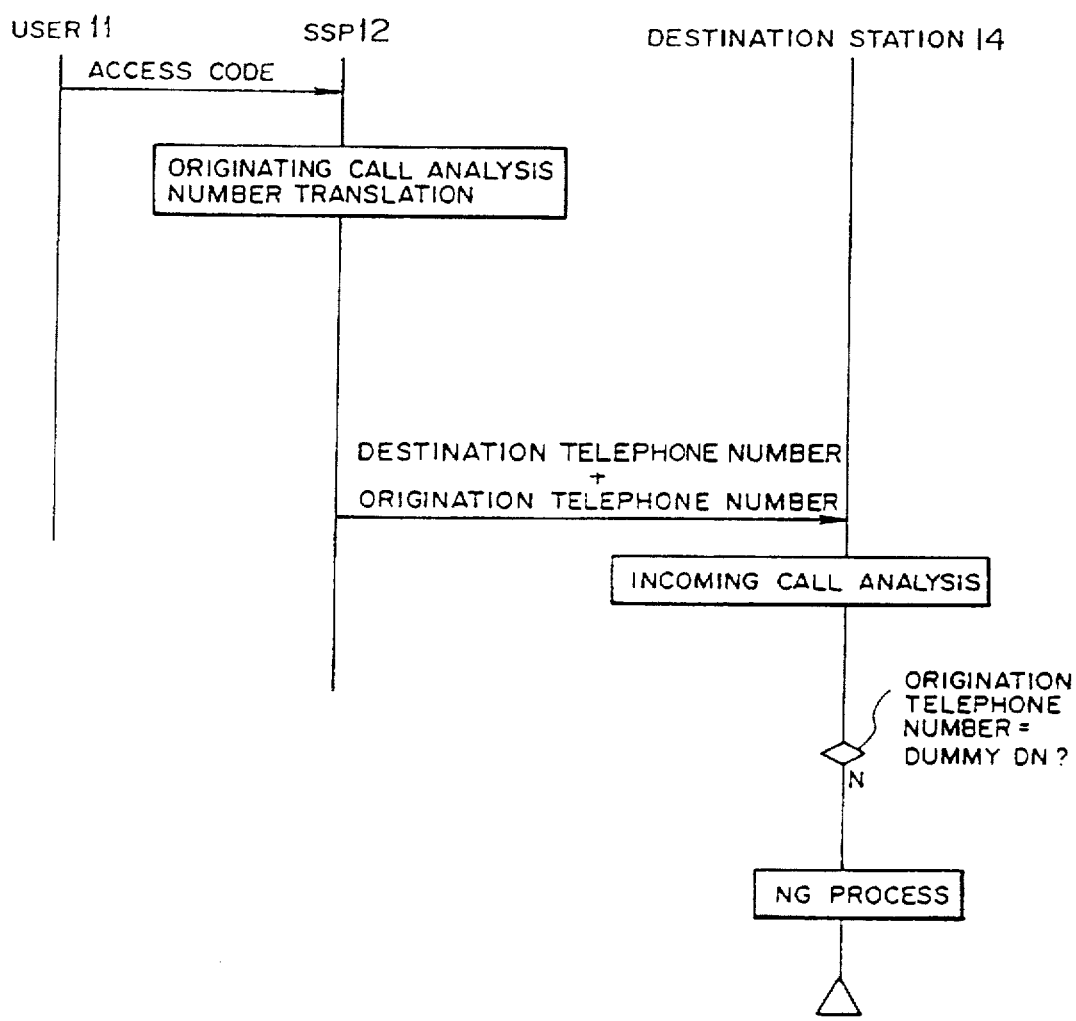
FIG. 22 is a signal sequence chart used for explaining an example of a regulated call in the third embodiment of the present invention.
Figure 23:
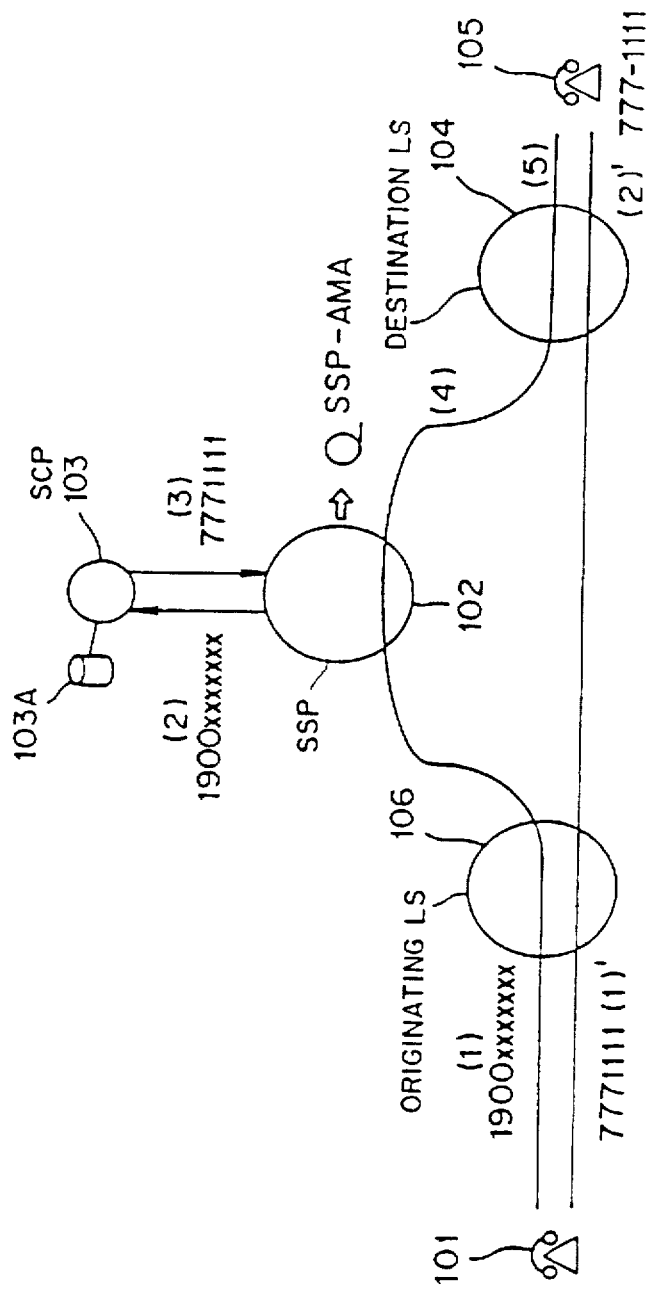
FIG. 23 is a block diagram illustrating an example of a service exchange system.

This signal sequence is shown in FIG. 22.

In such a manner, even when the originating subscriber 11 dials directly a converted telephone number of the IP 15 subject to an additional rate, without using a service access code SAC, an additional rate information offer service cannot be accepted without adding an additional charge. This means that a bypass call is certainly regulated to an information offer service.

According to the third embodiment, when there is an IN call, the SSP 12 transmits dummy information as originating subscriber information to the destination station 14 while the destination station 14 sends a call to the destination subscriber 15 in response to dummy information. As a result, it is regulated that the originating subscriber 11 sends a call to the IP 15, without dialing a special information offer service access code. Thus it can be certainly prevented that a special information offer service can be received for only normal charge without adding an additional charge.

In the third embodiment, a call may be input from the originating subscriber 11 to the SSP 12 via the originating station 16. In this case, the originating station 16 executes an origination analysis and a numerical translation. The originating station 16 further sends a service access code to the SSP 12.

What is claimed is:

1. An intelligent network call terminating method in an intelligent network, comprising:

a first step of accessing an information offer service, using service access information input by an originating subscriber;

a second step in which a service switching point accesses a service control point when said service switching point receives said service access information input in said first step;

a third step in which said service control point implements a desired service process corresponding to said service access information in response to the access in said second step, and then informs said service switching point of the result processed; and a fourth step in which said service switching point is connected to a destination station which accommodates a destination subscriber providing an information offer service, by using an information offer service-only signal route based on the result processed in said third step when there is said intelligent network call, so that an incoming call to said destination subscriber is established;

said fourth step including:

setting previously an information offer service display on subscriber data of a destination subscriber in said destination station while setting an information offer service access display on incoming trunk data in said information offer service-only signal route therein;

comparing said information offer service access display with said information offer service display in said destination station when there is an information call using said information offer service-only signal route; and then deciding whether said destination station makes said destination subscriber receive an incoming call according to the compared result.

2. An intelligent network call terminating method in an intelligent network, comprising:

a first step of accessing an information offer service, using service access information input by an originating subscriber;

a second step in which a service switching point accesses a service control point when said service switching point receives said service access information input in said first step;

a third step in which said service control point implements a desired service process corresponding to said service access information, in response to the access in said second step, and then informs said service switching point of the result processed; and a fourth step of transmitting, by said service switching point, a signal to which information representing said intelligent network call is added, to said destination office through an Integrated Services Digital Network User Part (ISUP) line, based on the result processed in said third step, when there is said intelligent network call; and making said destination subscriber receive an incoming call in said destination station when said signal to which information representing said intelligent network call is added is received;

said fourth step including:

setting previously said information offer service display on said subscriber data of said destination subscriber in said destination station;

comparing said information representing said intelligent network call with said information offer service display, in said destination office; and then deciding whether said destination office makes said destination subscriber receive an incoming call according to the compared result.

3. An intelligent network call terminating method in an intelligent network, comprising:

a first step of accessing an information offer service, using service access information input by an originating subscriber;

a second step in which a service switching point accesses a service control point when said service switching point receives said service access information input in said first step;

a third step in which said service control point implements a desired service process corresponding to said service access information, in response to the access in said second step, and then informs said service switching point of the result processed; and a fourth step of transmitting dummy information as originating subscriber information to said destination station, based on the result processed in said third step, when there is said intelligent network call, by means of said service switching point; and making said destination subscriber receive an incoming call when said destination station receives said dummy information.

4. A service exchange system used in an intelligent network, comprising:

means for accessing a service control point in response to service access information input by an originating subscriber;

means for outputting a signal sending an incoming call to said destination subscriber, to a destination station accommodating a destination subscriber providing an information offer service in response to said service process result from said service control point; and means for hunting an information offer service-only signal route when a service process result is received from said service control point.

5. A service exchange system used in an intelligent network, comprising:

means for accessing a service control point in response to service access information input by an originating subscriber;

means for outputting a signal sending an incoming call to said destination subscriber, to a destination station accommodating a destination subscriber providing information offer service in response to said service process result from said service point; and means for transmitting information by which an intelligent network call can be discriminated in said destination station in response to the service process result from said service control point;

wherein said transmitting means includes means that transmits dummy information utilized as originating subscriber information by said destination office, in response to the service process result from said service control point; and wherein said transmitting means is consisted as means that adapts for an Integrated Services Digital Network User Part (ISUP) line in response to the service process result from said service control point, and transmits a signal to which information representing said intelligent network call is added, to said destination station.

6. An service exchange system used in an intelligent network comprising:

means for accessing a service control point in response to service access information input by an originating subscriber;

means for outputting a signal sending an incoming call to said destination subscriber, to a destination station accommodating a destination subscriber providing information offer service in response to said service process result from said service point; and means for transmitting information by which an intelligent network call can e discriminated in said destination station in response to the service process result from said service control point;

wherein said transmitting means includes means that transmits dummy information utilized as originating subscriber information by said destination office, in response to the service process result from said service control point.

7. A destination exchange system used in an intelligent network, said intelligent network accommodating a destination subscriber providing an information offer service in response to a request from an originating subscriber, comprising:

an incoming trunk for accommodating an information offer service-only signal route;

means for terminating a call to said destination subscriber in response to a signal from service switching point input through said incoming trunk;

means for holding information offer service display on subscriber data of said destination subscriber;

means for arranging an information offer service access display on data of said incoming trunk;

comparing means for comparing information offer service access display with information offer service display when there is an incoming call using said information offer service-only signal route;

deciding means for deciding whether to terminate a call to said destination subscriber according to the result compared from said comparing means; and terminating means for terminating a call to said destination subscriber according to the result compared by said comparing means.

8. A destination exchange system used in an intelligent network, said intelligent network accommodating a destination subscriber providing an information offer service in response to a request from an originating subscriber, comprising:

receiving means for receiving a signal to which information representing an intelligent network call is added;

means for terminating a call to said destination subscriber in response to said signal received by said receiving means;

means for holding information offer service display on subscriber data of a destination subscriber;

receiving means for receiving a signal sent from an ISUP line, said signal to which information representing an intelligent network call is added;

comparing means for comparing said signal sent to which information representing an intelligent network call is added, with said information offer service display;

means for deciding whether to terminate an incoming call to said destination subscriber according to the result compared by said comparing means; and terminating means for terminating a call to said destination subscriber according to the result decided by said deciding means.

9. An destination exchange system used in an intelligent network, said intelligent network accommodating a destination subscriber providing an information offer service in response to a request from an originating subscriber, comprising:

receiving means for receiving a signal to which information representing an intelligent network call is added; and means for terminating a call to said destination subscriber in response to said signal received by said receiving means;

wherein said signal to which information representing said intelligent network call is added is formed as a dummy information signal representing originating subscriber information; and further comprising terminating means for terminating a call to said destination subscriber in response to said dummy information signal.

* * * * *